(12) United States Patent
Plache et al.

(10) Patent No.: US 9,217,998 B2
(45) Date of Patent: Dec. 22, 2015

(54) MANAGEMENT AND DEVELOPMENT OF AN INDUSTRIAL ENVIRONMENT

(75) Inventors: Kenneth Plache, Scottsdale, AZ (US); Daniel B. Seger, III, Kennesaw, GA (US); Raymond Staron, Chagrin Falls, OH (US); Robert J. Kretschmann, Bay Village, OH (US); Taryl Jasper, South Euclid, OH (US); James Harry Jarrett, Baltimore, MD (US); Russell Brandes, Brunswick, OH (US); Ronald Bliss, Twinsburg, OH (US); Michael Kalan, Highland Heights, OH (US); Subbian Govindaraj, Solon, OH (US); Kenwood Hall, Hudson, OH (US); Douglas J. Reichard, Fairview, OH (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 1363 days.

(21) Appl. No.: 12/893,883

(22) Filed: Sep. 29, 2010

(65) Prior Publication Data

US 2011/0022192 A1  Jan. 27, 2011

Related U.S. Application Data

(63) Continuation-in-part of application No. 11/536,715, filed on Sep. 29, 2006, now Pat. No. 7,856,279, and a continuation-in-part of application No. 11/536,746, filed on Sep. 29, 2006, now Pat. No. 7,835,805, and a (Continued)

(51) Int. Cl.
*G05B 11/01* (2006.01)
*G05B 19/418* (2006.01)

(52) U.S. Cl.
CPC .. *G05B 19/4188* (2013.01); *G05B 2219/31395* (2013.01)

(58) Field of Classification Search
CPC ................ G05B 19/4188; G05B 2219/31395
USPC ........... 700/9, 19, 20, 28, 209; 709/200–203, 709/224; 710/100; 705/26.5–27.2
See application file for complete search history.

(56) References Cited

U.S. PATENT DOCUMENTS

| 5,485,620 A | 1/1996 | Sadre et al. |
| 5,522,066 A | 5/1996 | Lu |

(Continued)

FOREIGN PATENT DOCUMENTS

| CN | 101201598 A | 6/2008 |
| CN | 101201599 A | 6/2008 |

(Continued)

OTHER PUBLICATIONS

OA dated Jan. 25, 2012 for U.S. Appl. No. 12/241,327, 45 pages.

(Continued)

*Primary Examiner* — Kenneth M Lo
*Assistant Examiner* — Chad Rapp
(74) *Attorney, Agent, or Firm* — Amin, Turocy & Watson, LLP

(57) ABSTRACT

System(s), apparatus(es) and method(s) are provided for to managing and developing an industrial system included in the industrial environment. Intelligence related to a configuration of the industrial system is collected and processed to generate information related to operational condition(s) of the industrial system. Intelligence can be collected actively or passively: In active collection, a platform that collects the intelligence retrieves configuration record(s) from the industrial system, whereas in passive collection, the platform received one or more configuration records from the industrial automation system. Collected intelligence is cast into a set of configuration units that defines industrial system and functionality thereof. In addition, a set of services configured to convey specific functionality associated with at least one configuration unit is composed. At least a portion of the generated information can be supplied to the industrial system or one or more components thereof in accordance with a policy configured by the industrial automation system.

30 Claims, 13 Drawing Sheets

Related U.S. Application Data continuation-in-part of application No. 11/536,760, filed on Sep. 29, 2006, now Pat. No. 7,912,560, and a continuation-in-part of application No. 11/536,791, filed on Sep. 29, 2006, now abandoned, and a continuation-in-part of application No. 12/241,319, filed on Sep. 30, 2008, now Pat. No. 8,818,757, and a continuation-in-part of application No. 12/241,327, filed on Sep. 30, 2008, now Pat. No. 8,265,775, and a continuation-in-part of application No. 12/241,342, filed on Sep. 30, 2008, now Pat. No. 8,041,435.

(56) References Cited

U.S. PATENT DOCUMENTS

| | | |
|---|---|---|
| 5,530,861 A | 6/1996 | Diamant et al. |
| 5,812,394 A | 9/1998 | Lewis et al. |
| 5,907,704 A | 5/1999 | Gudmundson et al. |
| 5,946,681 A | 8/1999 | Shorter |
| 6,067,299 A | 5/2000 | DuRee |
| 6,085,222 A | 7/2000 | Fujino et al. |
| 6,104,962 A | 8/2000 | Sastry |
| 6,154,684 A | 11/2000 | Schwenke et al. |
| 6,167,383 A * | 12/2000 | Henson ............. 705/26.5 |
| 6,269,254 B1 | 7/2001 | Mathis |
| 6,437,805 B1 | 8/2002 | Sojoodi et al. |
| 6,477,435 B1 | 11/2002 | Ryan |
| 6,505,247 B1 | 1/2003 | Steger et al. |
| 6,539,271 B2 | 3/2003 | Lech et al. |
| 6,553,268 B1 | 4/2003 | Schwenke et al. |
| 6,615,166 B1 | 9/2003 | Guheen et al. |
| 6,618,856 B2 | 9/2003 | Coburn et al. |
| 6,718,533 B1 | 4/2004 | Schneider et al. |
| 6,868,538 B1 | 3/2005 | Nixon et al. |
| 7,016,759 B2 | 3/2006 | Kaever et al. |
| 7,020,697 B1 | 3/2006 | Goodman et al. |
| 7,043,311 B2 | 5/2006 | Nixon et al. |
| 7,058,712 B1 | 6/2006 | Vasko et al. |
| 7,080,066 B1 | 7/2006 | Scheurich et al. |
| 7,089,530 B1 | 8/2006 | Dardinski et al. |
| 7,096,465 B1 | 8/2006 | Dardinski et al. |
| 7,146,232 B2 | 12/2006 | Staron et al. |
| 7,159,007 B2 | 1/2007 | Stawikowski et al. |
| 7,194,446 B1 | 3/2007 | Bromley et al. |
| 7,197,493 B2 | 3/2007 | Ashby et al. |
| 7,225,037 B2 | 5/2007 | Shani |
| 7,233,830 B1 | 6/2007 | Callaghan |
| 7,266,677 B1 | 9/2007 | Bromley et al. |
| 7,272,815 B1 | 9/2007 | Eldridge et al. |
| 7,363,338 B2 | 4/2008 | Kaakani et al. |
| 7,395,122 B2 | 7/2008 | Kreidler et al. |
| 7,418,305 B2 | 8/2008 | Buesgen et al. |
| 7,505,817 B2 | 3/2009 | McDaniel et al. |
| 7,509,249 B2 | 3/2009 | Britt et al. |
| 7,627,385 B2 | 12/2009 | McGreevy et al. |
| 7,653,008 B2 | 1/2010 | Patrick et al. |
| 7,676,279 B2 | 3/2010 | Hood et al. |
| 7,970,830 B2 | 6/2011 | Staggs et al. |
| 7,979,488 B2 | 7/2011 | Thibault et al. |
| 8,214,455 B2 | 7/2012 | Baier et al. |
| 2001/0034557 A1 | 10/2001 | Hudson et al. |
| 2001/0052113 A1 | 12/2001 | Hearne et al. |
| 2002/0059272 A1 | 5/2002 | Porter |
| 2002/0156548 A1 | 10/2002 | Arackaparambil et al. |
| 2003/0023336 A1 | 1/2003 | Kreidler et al. |
| 2003/0045950 A1 | 3/2003 | Bronikowski et al. |
| 2003/0061274 A1 | 3/2003 | Lo |
| 2003/0150927 A1 | 8/2003 | Rosen |
| 2003/0163656 A1 | 8/2003 | Ganton |
| 2004/0015568 A1 | 1/2004 | Kaakani et al. |
| 2004/0139427 A1 | 7/2004 | Garvey |
| 2004/0199925 A1 | 10/2004 | Nixon et al. |
| 2004/0230328 A1 | 11/2004 | Armstrong et al. |
| 2004/0230643 A1 | 11/2004 | Thibault et al. |
| 2005/0027831 A1 * | 2/2005 | Anderson et al. ............. 709/220 |
| 2005/0080788 A1 | 4/2005 | Murata |
| 2005/0125735 A1 | 6/2005 | Cohen et al. |
| 2005/0132064 A1 | 6/2005 | Lo |
| 2005/0229004 A1 * | 10/2005 | Callaghan ............. 713/185 |
| 2005/0234873 A1 | 10/2005 | Milligan |
| 2005/0256735 A1 | 11/2005 | Bayne |
| 2006/0031855 A1 | 2/2006 | Smithline |
| 2006/0037008 A1 | 2/2006 | Stelzer et al. |
| 2006/0059127 A1 | 3/2006 | Berry et al. |
| 2006/0179032 A1 | 8/2006 | Gottsman et al. |
| 2006/0206448 A1 | 9/2006 | Hyder et al. |
| 2006/0212146 A1 | 9/2006 | Johnson et al. |
| 2006/0259954 A1 | 11/2006 | Patrick et al. |
| 2006/0271505 A1 | 11/2006 | Vierich et al. |
| 2006/0277289 A1 | 12/2006 | Bayliss et al. |
| 2007/0011281 A1 | 1/2007 | Jhoney et al. |
| 2007/0055757 A1 | 3/2007 | Mairs et al. |
| 2007/0073850 A1 | 3/2007 | Callaghan et al. |
| 2007/0089063 A1 | 4/2007 | Breyer |
| 2007/0124475 A1 | 5/2007 | Syed et al. |
| 2007/0142941 A1 | 6/2007 | McGreevy et al. |
| 2007/0250630 A1 | 10/2007 | Blanding |
| 2007/0256051 A1 | 11/2007 | Rojer |
| 2008/0022151 A1 | 1/2008 | Stange et al. |
| 2008/0040477 A1 | 2/2008 | Johnson et al. |
| 2008/0079558 A1 | 4/2008 | Dorgelo et al. |
| 2008/0082186 A1 | 4/2008 | Hood et al. |
| 2008/0082577 A1 | 4/2008 | Hood |
| 2008/0082636 A1 | 4/2008 | Hofmann et al. |
| 2008/0082959 A1 | 4/2008 | Fowler et al. |
| 2008/0092131 A1 | 4/2008 | McIntyre et al. |
| 2008/0120367 A1 | 5/2008 | Thibault et al. |
| 2008/0127065 A1 | 5/2008 | Bryant et al. |
| 2008/0133700 A1 | 6/2008 | Thibault et al. |
| 2008/0140230 A1 | 6/2008 | Bromley |
| 2008/0201297 A1 | 8/2008 | Choi et al. |
| 2008/0208361 A1 | 8/2008 | Grgic |
| 2008/0208368 A1 | 8/2008 | Grgic |
| 2008/0222276 A1 | 9/2008 | Thibault et al. |
| 2008/0284649 A1 * | 11/2008 | Bratthall et al. ......... 342/357.13 |
| 2009/0083705 A1 | 3/2009 | Phillips et al. |
| 2009/0083843 A1 | 3/2009 | Wilkinson et al. |
| 2009/0094326 A1 | 4/2009 | Thibault et al. |
| 2009/0328012 A1 | 12/2009 | Aharoni et al. |
| 2010/0088104 A1 | 4/2010 | DeRemer et al. |
| 2010/0192125 A1 | 7/2010 | Son et al. |

FOREIGN PATENT DOCUMENTS

| | | |
|---|---|---|
| DE | 19614789 C1 | 9/1997 |
| DE | 101 29 564 A1 | 9/2002 |
| EP | 1276026 A | 1/2003 |
| EP | 1422619 A | 5/2004 |
| EP | 1 772 785 A | 4/2007 |
| EP | 1 906 276 A2 | 4/2008 |
| EP | 1 936 496 A1 | 6/2008 |
| EP | 1 906 276 A3 | 12/2009 |
| EP | 2 169 597 A1 | 3/2010 |
| EP | 2 169 598 A1 | 3/2010 |
| EP | 2 169 599 A1 | 3/2010 |
| WO | 0195041 A1 | 12/2001 |
| WO | 02/31607 A | 4/2002 |
| WO | 2004086160 A1 | 10/2004 |

OTHER PUBLICATIONS

Office Action dated Jul. 19, 2013 for U.S. Appl. No. 12/241,319, 42 pages.
Office Action dated Sep. 30, 2013 for U.S. Appl. No. 12/893,550, 48 pages.
Notice of Allowance dated Sep. 13, 2013 for U.S. Appl. No. 12/893,804, 25 pages.
OA dated Aug. 20, 2012 for U.S. Appl. No. 12/893,545, 52 pages.
Article entitled "Viewanyware solutions from Rockwell Automation", by SAIMC, dated May 2001.
Article entitled "Automation Today", by Rockwell, dated Feb. 2001.
Article entitled "ViewAnyWare" by Rockwell, dated Jun. 10, 2004.
Article entitled "ViewAnyWare: Picture the Reaility" by Rockwell, Copyright 2004.

(56) References Cited

OTHER PUBLICATIONS

OA dated Aug. 2, 2012 for U.S. Appl. No. 12/893,366, 50 pages.
European Search Report for European Patent Application No. EP07117140, dated May 7, 2008, 8 pages.
Sweet, et al. Managing Technology Change in Industrial Automation. Proceedings of the Third IEEE Conference on Control Applications, Aug. 24-26, 1994, pp. 3-6, vol. 1. An ABB Overview of Research Priorities.
Maaref, et al. Communication System for Industrial Automation, Proceedings of the IEEE International Symposium on Industrial Electronics, Jul. 7-11, 1997. Laboratoire Logiciels System Reseaux-Image, IEEE, pp. 1286-1291.
OA Dated Oct. 6, 2008 for U.S. Appl. No. 11/536,715, 23 pages.
OA Dated Oct. 29, 2008 for U.S. Appl. No. 11/536,746, 23 pages.
OA Dated Oct. 29, 2008 for U.S. Appl. No. 11/536,791, 43 pages.
OA Dated Oct. 7, 2008 for U.S. Appl. No. 11/536,760, 33 pages.
OA Dated Jan. 9, 2009 for U.S. Appl. No. 11/536,827, 18 pages.
OA dated Apr. 13, 2009 for U.S. Appl. No. 11/536,746, 23 pages.
OA dated Mar. 24, 2009 for U.S. Appl. No. 11/536,715, 38 pages.
OA dated Apr. 23, 2009 for U.S. Appl. No. 11/536,760, 22 pages.
OA dated Apr. 17, 2009 for U.S. Appl. No. 11/536,791, 37 pages.
OA dated Aug. 24, 2009 for U.S. Appl. No. 11/536,746, 18 pages.
OA dated Aug. 21, 2009 for U.S. Appl. No. 11/536,760, 17 pages.
OA dated Aug. 6, 2009 for U.S. Appl. No. 11/536,791, 38 pages.
OA dated Jun. 23, 2009 for U.S. Appl. No. 11/536,827, 22 pages.
OA dated Oct. 20, 2009 for U.S. Appl. No. 11/536,715, 41 pages.
European Search Report dated Nov. 20, 2009 for European Application No. EP 07 11 7192, 9 pages.
"Simatic, Working with Step V5.1, Edition Aug. 2000, A5E00069681-03". Aug. 2000, Siemens, D-90327, Nurnberg, DE, XP002554626.
Fayad, et al. "HMI as a Maintainance tool." Advances in Instrumentation and Control, Instrument Society of America, Research Triangle Park, US, vol. 2, part 1, Jan. 1, 1998, pp. 119-134, XP000875207, ISSN: 1054-0032, p. 124, last paragraph—p. 133, last paragraph.
OA dated Jan. 26, 2010 for U.S. Appl. No. 11/536,791, 39 pages.
OA dated Mar. 8, 2010 for U.S. Appl. No. 11/536,760, 19 pages.
OA dated Mar. 8, 2010 for U.S. Appl. No. 11/536,746, 21 pages.
Raymond Staron, et al. Use of an Agent Type Library for the Design and Implementation of Highly Flexible Control Systems. Last accessed on Oct. 10, 2008, 6 pages.
Marvin J. Schwenke, et al. Specifying a Control Program with High Level Graphical Editors. (c) 2001 Society of Automotive Engineers, Inc. Last accessed on Oct. 10, 2008, 9 pages.
Marvin J. Schwenke, et al. Use of a Type Library to Speed Up PLC Program Design and Commissioning. Last accessed on Oct. 10, 2008, 13 pages.
European Search Report for European Application No. 09171807.2-1238 dated Feb. 4, 2008, 7 pages.
European Search Report on European Patent Application No. EP09171802.3-1238, dated Jan. 29, 2010, 6 pages.
European Search Report for European Application No. 09171806.4-1238 dated Apr. 2, 2010, 8 pages.
European Search Report dated Jan. 25, 2010 for European Application No. EP09171807, 2 pages.
OA dated May 14, 2010 for U.S. Appl. No. 11/536,715, 49 pages.
"Datastream 7i for SQL Server": Jun. 13, 2006, Infor, 2 pages.
European Search Report Dated Jan. 21, 2010 for European Application No. EP09171802, 2 pages.
European Search Report Dated Jan. 27, 2010 for European Application No. EP09171806, 2 pages.
OA dated Sep. 17, 2010 for U.S. Appl. No. 12/241,319, 32 pages.
OA dated Oct. 24, 2011 for U.S. Appl. No. 11/536,791, 35 pages.
OA dated Feb. 4, 2013 for U.S. Appl. No. 12/893,545, 36 pages.
OA dated Apr. 25, 2013 for U.S. Appl. No. 12/893,804, 39 pages.
OA dated Feb. 1, 2013 for U.S. Appl. No. 12/893,366, 20 pages.
OA dated Dec. 16, 2010 for U.S. Appl. No. 11/536,818, 50 pages.
OA dated Mar. 22, 2011 for U.S. Appl. No. 12/241,319, 23 pages.
OA dated Feb. 24, 2011 for U.S. Appl. No. 12/241,342, 35 pages.
OA dated May 10, 2011 for U.S. Appl. No. 11/536,791, 46 pages.
Office Action dated Feb. 13, 2014 for U.S. Appl. No. 12/241,319, 24 pages.
OA dated Jul. 17, 2014 for U.S. Appl. No. 12/893,366, 26 pages.

* cited by examiner

MANAGEMENT AND DEVELOPMENT OF AN INDUSTRIAL ENVIRONMENT

CROSS-REFERENCE TO RELATED APPLICATIONS

This application is a Continuation-in-Part of co-pending U.S. patent application Ser. No. 11/536,715, entitled "MODULE STRUCTURE AND USE FOR INDUSTRIAL CONTROL SYSTEMS," filed on Sep. 29, 2006; this application is also a Continuation-in-Part of co-pending U.S. patent application Ser. No. 11/536,746, entitled "HMI VIEWS OF MODULES FOR INDUSTRIAL CONTROL SYSTEMS," filed on Sep. 29, 2006; this application is also a Continuation-in-Part of co-pending U.S. patent application Ser. No. 11/536,760, entitled "MODULE AND CONTROLLER OPERATION FOR INDUSTRIAL CONTROL SYSTEMS," filed on Sep. 29, 2006; this application is also a Continuation-in-Part of co-pending U.S. patent application Ser. No. 11/536,791, entitled "MODULE CLASSIFICATION AND SEARCHING FOR INDUSTRIAL CONTROL SYSTEMS," filed on Sep. 29, 2006; this application is also a Continuation-in-Part of co-pending U.S. patent application Ser. No. 12/241,319, entitled "MODULE AND HOST MATCHING," filed on Sep. 30, 2008; this application is also a Continuation-in-Part of co-pending U.S. patent application Ser. No. 12/241,327, entitled "MODULE PUBLICATION AND DISCOVERY," filed on Sep. 30, 2008; this application is also a Continuation-in-Part of co-pending U.S. patent application Ser. No. 12/241,342, entitled "MODULE DYNAMIC HOSTING," filed on Sep. 30, 2008, the entireties of which are incorporated herein by reference.

TECHNICAL FIELD

The subject disclosure relates generally to operation of an industrial environment and, more specifically, to managing and developing an industrial system included in the industrial environment.

BACKGROUND

Industrial control systems can employ complex mechanical, electronic, electro-mechanical, and/or robotic machinery to perform various automated mechanical and/or electrical functions. Examples of machinery include industrial motors, pumps, conveyors, escalators, drills, refrigeration systems, and so forth. An industrial control system can utilize one or more control devices to activate or deactivate the machinery and/or to determine an appropriate level of activation for the machinery (e.g., an amount of current to supply to a variable input motor). Additionally, the control devices can be associated with logical program code that determines an appropriate time, degree, manner, and other criteria for operation of the machinery. For example, the determination can be based on various circumstances, including an output of another device, a reading of an optical sensor, an electronic measurement, a movement, a number of rotations of a device, and so on.

The machinery can be controlled by at least one industrial controller, such as, for example, programmable logic controllers. The industrial controllers can also communicate with higher level computing systems or servers that aggregate data from the controllers and help to manage day-to-day activities of an enterprise. As systems have become more complex, however, communications and functional cooperation between components of the industrial automation system has become a challenge. For instance, when users purchase multiple products from one or more vendors, there is often limited interoperability and consistency between such products. Software and control engineers must then learn each product and how the components interact with each other. Limited product and component consistency suggest that techniques engineers learn for one product do not necessarily carry over to other implementations.

Often, integration of products in the industrial automation system is complex and difficult to manage. Process and control engineers cannot easily code and configure their respective components without concern for other system components, which may have different manufacturers and different platforms.

Another problem with integration of products is that process and control engineers focus on underlying technical details, including implementation and glue logic, rather than the application level concerns, for example process information. For instance, an engineer may decide to automate a manual section of their plant. The design may start at a high level but soon becomes a series of discussions regarding nonfunctional requirements e.g., distributed component object model (DCOM), transmission control protocol (TCP), transaction rates, and the like. While these nonfunctional requirements are important, the design of functional requirements is where the true value is to the designer or end user. Thus, the engineer would prefer to focus on functional requirements (equipment control, product flow control, and so forth) providing direct improvements in value rather than dealing with superfluous technology issues.

In another case, system design does not sufficiently enable trade-offs between overhead burden (memory footprint, CPU cycles, and so forth) and application coupling. For instance, processing load should be distributed across the system in accordance with system capabilities. Thus, if one part of the system is shut down, alternative processing capability should be in place to allow production to continue. For example, control and process engineers can initially design and install a control system suiting their immediate needs. Current solutions however do not facilitate a smooth and uncomplicated transition for the respective changes. Multiple technologies underneath many vendors' products complicate configuration and management of systems. This is also aggravated when third party systems are involved. Such complexity hinders the system's capacity to provide higher-level information and can reduce the ability to configure such systems.

SUMMARY

The following presents a simplified summary in order to provide a basic understanding of some aspects of the subject disclosure. This summary is not an extensive overview, and it is not intended to identify key/critical elements of the subject disclosure or to delineate any scope. The sole purpose of this summary is to present some concepts in a simplified form as a prelude to the more detailed description that is presented later.

One or more embodiments in the subject disclosure provider system(s), apparatus(es), and method(s) for managing and developing an industrial system included in the industrial environment. Intelligence related to a configuration of the industrial system is collected and processed to generate information related to operational condition(s) of the industrial system. Intelligence can be collected actively or passively: In active collection, a platform that collects the intelligence retrieves configuration record(s) from the industrial system, whereas in passive collection, the platform receives one or more configuration records from the industrial automation system. Collected intelligence is cast into a set of configuration units that defines industrial system and functionality thereof. In addition, a set of services configured to convey specific functionality associated with at least one configuration unit is composed. At least a portion of the generated information can be supplied to the industrial system or one or more components thereof in accordance with a policy configured by the industrial automation system.

An apparatus disclosed herein includes a configuration component that produces at least one configuration unit that conveys a set of configuration records related to an industrial system, and a service generator that composes a service configured to expose specific functionality associated with the at least one configuration unit. The at least one configuration unit conveys functionality of the industrial system. To at least that end, the at least one configuration unit can include at least one data structure that characterizes logically the industrial system and conveys functionality thereof. In addition or in the alternative, the configuration component can exploit a set of rules that dictate, at least in part, the manner in which the at least one data structure is to be constructed, the set of rules is specific to the industrial system and the at least one data structure is one of a data tree or a relational table. In an aspect, the service is configured to expose specific functionality associated with the at least one configuration unit through generation of at least one view of at the least one data structure (e.g., a view of the data tree). In another aspect, the service generates the at least one view in response to reception of signaling, and associated payload, that conveys occurrence of a predetermined event related to operation of a services provider platform that includes the apparatus described supra. As an example, one such predetermined event is generation of or an update to the at least one configuration unit.

Also disclosed is apparatus that includes a management component that responds to a query or request from an industrial system. The query or request can be related to availability of an update for at least one functional element (a host, equipment, network node) of the industrial system. In an aspect, the management component can compare at least one configuration record (which can be part of a configuration unit) related to the industrial system with data associated with development (design, acceptance phase(s), upgrade(s), etc.) of the at least one functional element. Based at least on a result of the comparison, the management component can deliver a response to the query or request. To produce the response, the management component can acquire (retrieve, receive, etc.) the data associated with development of the at least one functional element from at least one repository related to at least one service provider platform other than the service provider platform that includes the management component. As an illustration, the response can be a report that conveys whether at least one update is available for the at least one functional element, the report can be supplied in accordance with at least one communication formats. The management component described herein also can generate an inventory of a current or last-known configuration of the industrial system with respect to a previous configuration thereof. The inventory can be directed to physical aspects of the industrial system or software aspects thereof. In an aspect, to generate such inventory, the management component can acquire a group of configuration records from the industrial system in accordance with an access policy configured by an administration host of the industrial system, the group of configuration records is a source of data, metadata, or both.

The subject disclosure also provides a variety of design features. In an aspect, disclosed is an apparatus that includes a design component that identifies an area of operational improvement for the industrial system, an area of operational improvement includes at least one update to equipment, wherein the at least one update is at least one of a software update or a hardware update. As part of identification of an area of operation improvement, the design component can analyze one or more inventories of a current or last-known configuration of the industrial system. Moreover, based at least on the analysis, the design component can issue a report that discloses the area of operational improvement and at least one related solution. As part of issuance of the report, the design component delivers the report to at least the industrial system in accordance with a policy that includes a set of settings for delivery of the report. Furthermore, based on the analysis, the design component can generate automatically a solution for an area of operational improvement. The solution can include generation of a composite service from a plurality of two or more services available to the industrial system or developed by the service provider platform that includes the design component.

To the accomplishment of the foregoing and related ends, certain illustrative aspects of the disclosed innovation are described herein in connection with the following description and the annexed drawings. These aspects are indicative, however, of but a few of the various ways in which the principles disclosed herein can be employed and is intended to include all such aspects and their equivalents. Other advantages and novel features will become apparent from the following detailed description when considered in conjunction with the drawings.

DETAILED DESCRIPTION

Figure 1:
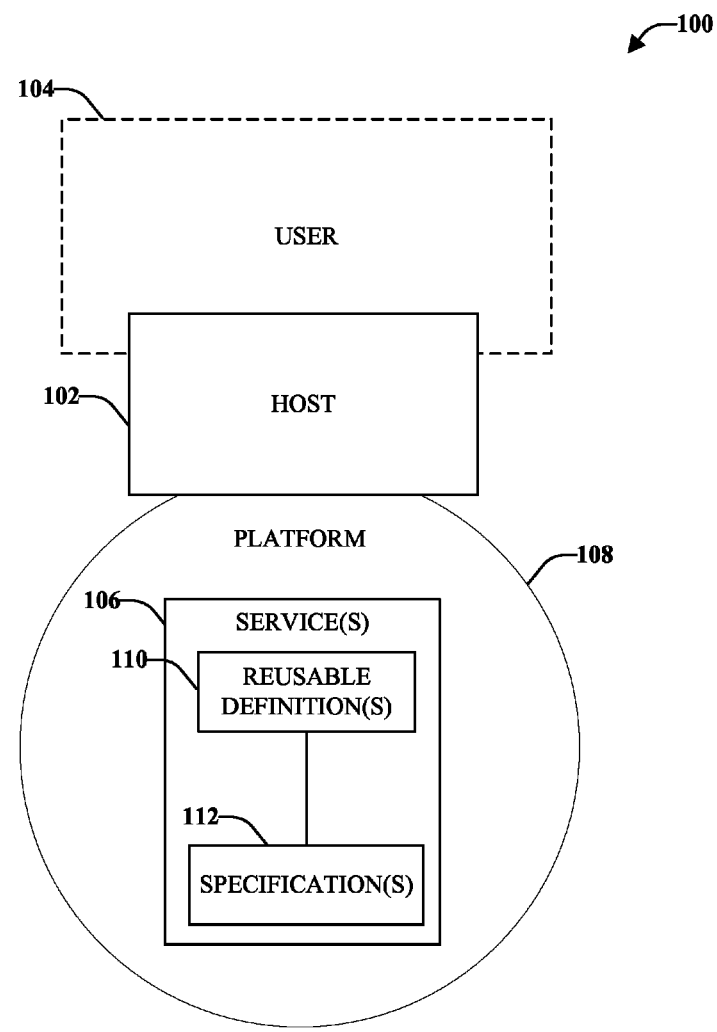
FIG. 1 is a block diagram illustrating interaction of a service and a host in an industrial automation system in accordance with aspects described herein.

The subject disclosure is now described with reference to the drawings, wherein like reference numerals are used to refer to like elements throughout. In the following description, for purposes of explanation, numerous specific details are set forth in order to provide a thorough understanding thereof. It may be evident, however, that the subject disclosure can be practiced without these specific details. In other instances, well-known structures and devices are shown in block diagram form in order to facilitate a description thereof.

As used in this application, the terms "component," "system," "platform," "layer," "controller," "terminal," "station," "node," "interface" are intended to refer to a computer-related entity or an entity related to, or that is part of, an operational apparatus with one or more specific functionalities, wherein such entities can be either hardware, a combination of hardware and software, software, or software in execution. In the subject disclosure, either of the foregoing entities is referred to as a functional element. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Also, components as described herein can execute from various computer readable storage media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry which is operated by a software or a firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that provides at least in part the functionality of the electronic components. As further yet another example, interface(s) can include input/output (I/O) components as well as associated processor, application, or Application Programming Interface (API) components. While the foregoing examples are directed to aspects of a component, the exemplified aspects or features also apply to a system, platform, interface, layer, controller, terminal, station, node, interface, and the like.

In addition, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Furthermore, the term "set" as employed herein excludes the empty set, e.g., the set with no elements therein. Thus, a "set" in the subject disclosure includes one or more elements or entities. As an illustration, a set of controllers includes one or more controllers; a set of data resources includes one or more data resources; etc. Likewise, the term "group" as utilized herein refers to a collection of one or more entities; for example, a group of nodes refers to one or more nodes.

Various aspects or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches also can be used.

Additionally, features or aspects described in the subject disclosure can rely, at least in part, on delivery or reception of query(ies), request(s), indication(s), or the like, and information or payload data associated therewith. Query(ies) or request(s) can be embodied in multi-bit words (e.g., P-bit words, with P a positive integer) and coded to specifically convey a request to a particular functional element (a host, equipment, etc.) in order to execute one or more specific actions. Payload data associated with query(ies) or request(s) can be embodied, for example, in one or more reserved bits in a packet header, a light-payload data packet, a field of dedicated bits, a lightweight file (e.g., a cookie), an email communication, an instant message, or the like. Query(ies), request(s), indication(s), or the like, can be delivered in accordance with various communication protocols, wireless or otherwise.

Referring initially to FIG. 1, illustrated is an example industrial automation system 100, according to an aspect. The industrial automation system 100 is configured to utilize modular automation to construct applications with reusable software that exposes functionality of components of the industrial automation system 100, while providing an abstraction from details of communication and interaction with such components.

The industrial automation system 100 includes a host 102 that is configured to interface with a user and/or entities (e.g., the Internet, another system, a computer, and so forth), hereinafter referred to as user 104. The interface between host 102 and user 104 can be through various interface mechanisms, including a human-machine interface (HMI) or a graphical user interface (GUI). Although only a single host 102 is illustrated, industrial automation system 100 can include two or more hosts, according to an aspect. According to some aspects, the host 102 can be one or more industrial controllers (e.g., programmable automation controller (PAC), programmable logic controller (PLC), and so forth). The one or more industrial controllers can be associated with one or more human machine interfaces (HMIs). The term "industrial controller" as utilized herein can include functionality that can be shared across multiple components or networks.

The host 102 need not be limited to an industrial controller. According to some aspects, the host 102 can be (or can be associated with) one or more computer or network components within the industrial automation system 100. For example, the host 102 can be a computer, a server, a client, an industrial module, a human-machine interface (HMI), a graphical user interface (GUI), and so forth.

The host 102 can be configured to execute at least one service 106 based, at least in part, on input from the user 104. The service 106 is illustrated as contained within a platform 108, which can provide an interface between the host 102 and the service 106. For example, the service 106 can be an executable function for the industrial automation system 100 executed on a platform 108 of the host 102. By providing the interface between host 102 and the service 106, the platform 108 provides a set of abstractions that enable the service 106 to be implemented (e.g., compiled and executed) in disparate hosts without modification to the service. The platform 108 can be any type of hardware, software, or combination of hardware and software that allows the service 106 to run and/or execute; for instance, in certain embodiments, the platform 108 can be the Java™ programming language and computing platform. For example, the platform 108 can include one or more of a computer's architecture, an operating system, one or more programming languages, or user interfaces.

The service 106 can be employed as one or more executable functions for the industrial automation system 100. In accordance with some aspects, the service 106 is a reusable template that can be utilized in the development of software for the industrial automation system 100. The software can include, for example, control programs for physical manufacturing unit operations, such as assembly applications. The physical manufacturing unit can include, for example, conveyors, mixers, packaging units, process skids, robotic cells, tanks, valve matrices, and so forth. Additionally or alternatively, the software can include higher-level programs, such as batch processing applications, supervisory applications, monitoring applications, or control programs that control aspects of the industrial automation system 100.

According to some aspects, the service 106 can include one or more module objects, encapsulated objects, control objects, and so on. The service 106 can be configured to facilitate software development by hiding internal interfaces, messages, programming code, and so forth from the user 104 while providing standard and/or generic external interface(s). In accordance with some aspects, the service 106 can simplify programming in the industrial automation system 100 by allowing the user 104 (e.g., a process and control engineer) to work with published functionality of the service 106, which can be independent of how the functionality was achieved, which can mitigate integration and maintenance requirements and reduce costs. This can increase quality, consistency, and reusability of the software by providing a standardized programming structure between various components or hosts 102 (e.g., from different manufacturers) within the industrial automation system 100.

For example, utilizing services 106 can benefit both software developers and end users. For example, utilization of services can allow a developer of control applications to concentrate on the functionality of an application rather than the mechanics of implementation, such as by separating procedural control from equipment control. Services 106 can facilitate continuous software improvements; at the same time, services 106 can mitigate the risks that changes to the software may present to the industrial automation system 100. Utilization of services, as disclosed herein can simplify testing of software, and can provide a reduced chance that new software adversely affects other components or hosts 102 within the industrial automation system 100. This can also reduce development time, accelerate design cycles, and reduce cost. Services 106 can also allow end users (e.g., manufacturers) to separate procedural control from equipment control, which can allow end users to adopt existing assets to new product requirements with minimal time and capital investment.

According to various aspects, the service 106 can separate procedure control and equipment control by employing a hierarchically structured data model (e.g., a hierarchically structured data model according to the International Society for Automation (ISA)-88 standards). In such a manner, procedure control can be logically separated from equipment control. Logical separation can enable the separation of product-specific definitions, instructions, and information from processing equipment entities.

The service 106 can be configured to hide internal aspects from a user 104. For example, the service 106 (and/or platform 108) can include or can be associated with an interface. In accordance with some aspects, the interface can be located within the host 102. The interface can hide internal functions of the service 106, including the underlying code and complexity. According to an embodiment, the interface can define external behaviors supplied to at least one client application engaging the service 106. Through the interface, the service 106 can expose data, expose operations that can be performed, expose dependencies on other services, and so forth. The interface can allow the service 106 to connect to at least one other service to engage with a client application, according to an aspect. For example, an industrial process can be defined with a plurality of services, wherein a first service is a control service that controls a second service (e.g., equipment service) and a third service (e.g., material service), wherein the third service is subordinate to the second service. It is to be appreciated that the service 106 can support more than one interface, e.g., to engage with more than one client application, or to logically partition the functionality of the service. It should be appreciated that in certain scenarios a single interface can support a plurality of clients. Separation of a service 106 into multiple interfaces can allow one interface to be extended and/or changed without impacting other interface areas. Such separation can reduce the overall impact to areas of an industrial automation system that utilize the unchanged interface, but not the changed interface.

The interface can hide internal functions of the service 106. These internal functions can include one or more reusable definition(s) 110 and one or more specification(s) 112. At least one reusable definition or at least one specification embodies an implementation of a service and related interface(s). In accordance with some aspects, the service 106 can be an association of one or more reusable definitions 110 with one or more specifications 112. The one or more reusable definitions 110 and the one or more specification(s) 112 can include computer-executable programming code that, in response to execution thereof, can alter the state of one or more resources in an industrial automation system (e.g., logic code that can control opening and closing of a valve). The one or more reusable definition(s) 110 and the one or more specification(s) 112 can include programming code that is specific to a programming language, for example, ladder logic, function chart, scripting language, Java™, C, C#, C++, and so on. The one or more resources can include one or more of equipment, material, personnel, segments, storage, and so forth. For example, a resource may be a valve that is opened or closed according to logic code, where the logic code can be represented by at least one of specification(s) 112.

In accordance with some aspects, the programming code of the reusable definition 110 can be in a different physical location from the resource of the specification 112 within an enterprise resource control (ERC) system. It is to be appreciated that the service 106 can support more than one reusable definition 110. According to some aspects, different reusable definitions 110 can be targeted for different hosts such that a service 106 with more than one reusable definition 110 can be deployed to more than one host 102 where each host may have different computing capabilities and methods.

The service 106 can include external references (not illustrated) that can maintain metadata pertaining to the service 106, according to an aspect. For example, the external references can include information that describes dependencies of the service 106, required dependencies to support the reusable definitions 110 (e.g., operational requirements). The external references can also include, for example, specific qualities (e.g., performance, reliability, physical characteristics . . . ) of the service 106 and/or security aspects (e.g., security rules and automatic application thereof, or authentication procedures) of the service 106. The service 106 may also include other portions (not shown), such as local data, visualization elements, etc. Alternatively, a service 106 may be more limited in nature (e.g., only including a single specification 112).

Figure 2:
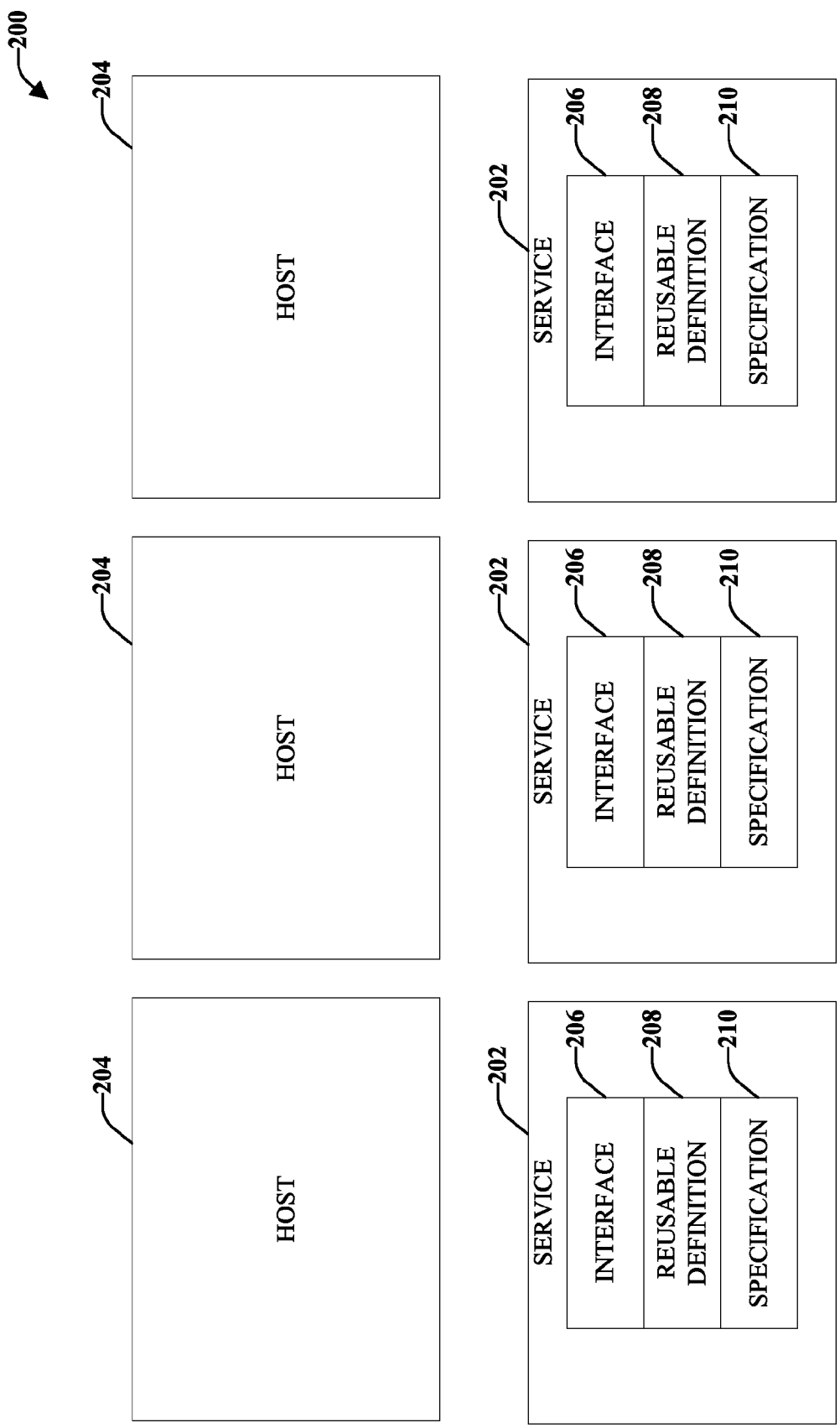
FIG. 2 is a block diagram illustrating a system that utilizes services and hosts accordance with aspects described herein.

FIG. 2 illustrates an example system 200, according to an aspect. System 200 can be a portion of an industrial control configuration of an industrial automation system. Included in system 200 are services 202 (e.g., modular objects, encapsulated objects, control objects, etc.) that can exist in conjunction with one or more hosts 204 upon an industrial control configuration. For example, the services 202 can exist in conjunction with the hosts 204 through an interface 206. Functionality related to the services 202 can be similar to plug-in approaches in software. For example, services 202 can be connected to control a process in the industrial control environment. Services 202 can be customizable and reusable, for example, among multiple users, multiple locations, multiple platforms, and/or multiple hosts 204.

The services 202 can grow into different layers of an organizational hierarchy to form a service-oriented control system. For example, an industrial process can be defined with a plurality of services 202, wherein one service is a control service, which controls an equipment service and a material service, wherein the material service is subordinate to the equipment service.

Generally, the service 202 is an association of one or more reusable definitions 208 with one or more specifications 210. Reusable definitions 208 and specifications 210 can include computer-executable programming code (or programming code) that, in response to execution thereof, can alter a state of one or more resources in the industrial control environment. For example, the reusable definitions 208 and specifications 210 can be at least one of logic code, including ladder logic, function chart, script, Java™, C code, and the like. It is to be appreciated that a service 202 can support multiple reusable definitions 208 (e.g., to engage with multiple hosts 204) or multiple specifications 210. The one or more resources can include one or more of equipment, material, personnel, segments, storage, and the like. For example, the resource may be a valve that is opened or closed according to logic code.

Similar to a plug-in approach in software, a service 202 can hide internal aspects (e.g., reusable definitions 208 and specifications 210) from a user. The service 202 can hide these aspects by providing standard and/or generic interfaces 206 to external systems. According to an embodiment, the interface 206 can allow the service 202 to expose external reference information about the service 202. For example, the external reference information can include information describing dependencies of the service 202, required connections to support the reusable definition 208, and the like. The service 202 can support multiple interfaces 206, which can allow the service 202 to engage with multiple hosts 204.

According to an embodiment, users and/or hosts 204 can access the services 202 across a network (not shown). The network may include, for example, any public or private network. For example, services 202 can be created in an offline manner, such as in a computer database (not shown). When created offline, the services 202 can be downloaded for execution on the hosts 204.

Figure 3:
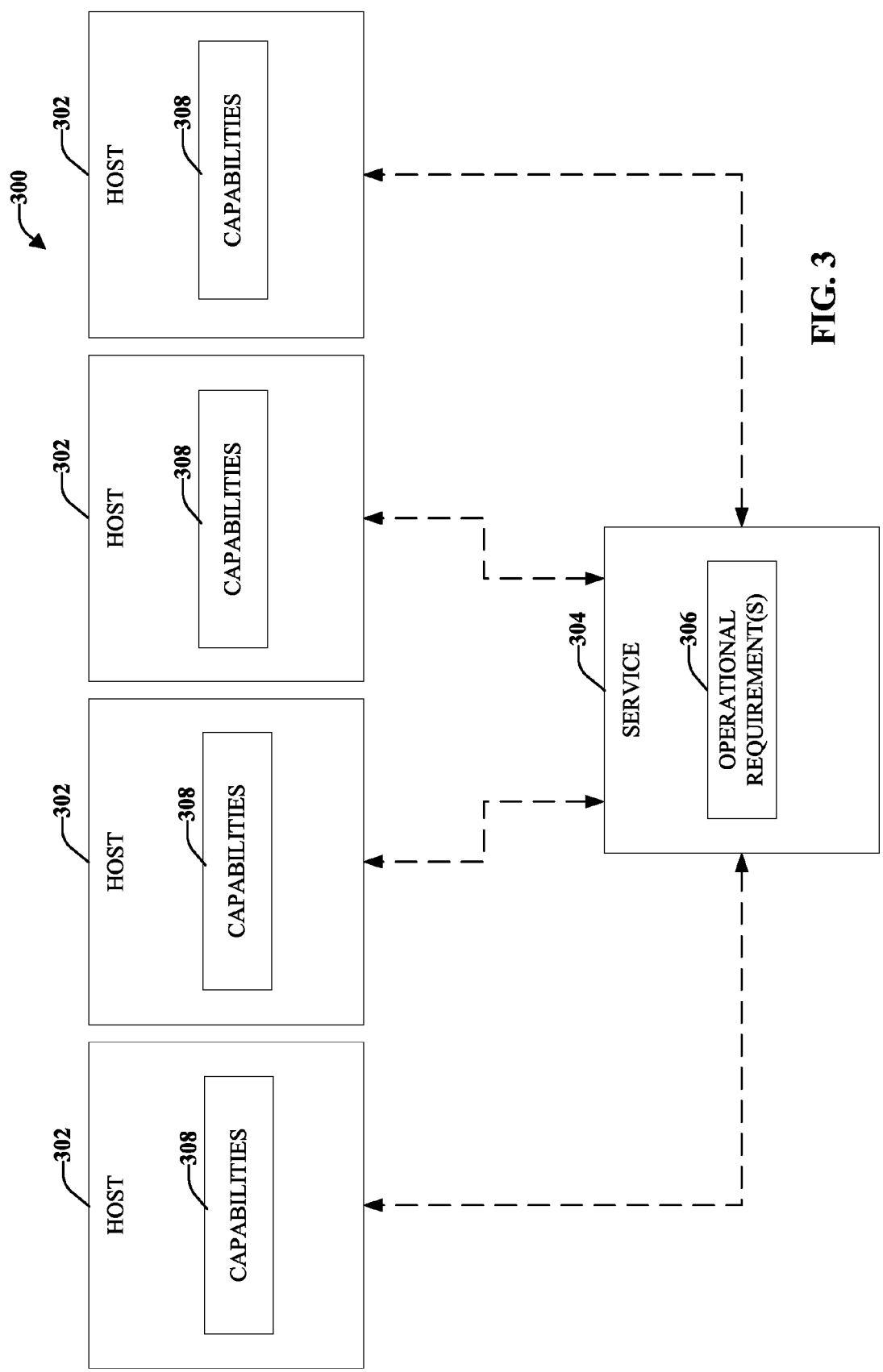
FIG. 3 is a block diagram illustrating a system for matching services and hosts in accordance with aspects described herein.

FIG. 3 illustrates an example system 300 for expressing matching among hosts 302 and a service 304. The service 304 can have one or more operation requirements 306. For example, the operation requirements 306 can be that a host should have a high resolution size and a large memory. Hosts 302 can have different capabilities 308 that can be exploited by the service 304. A binding (represented with a dotted line) can be created with a host in an attempt to match one or more operational requirement 306 with one or more capabilities 308. If more than one host 302 includes one or more hosting capabilities 308 that match one or more operational requirements 306 of a service 304, then multiple bindings can be created and/or selection of a single host can occur and one binding can be used. If no host 302 has a capability 308 matching an operational requirement 306 of the service 304, then an error message can be generated. In accordance with some aspects, if there are no current hosts 302 that match an operational requirement 306, periodic or continuous observation of the environment can occur to detect when a new host 302 that has the required capability 308 enters the environment. The periodic or continuous monitoring can also occur to detect modifications to an existing host 302 to determine when the host 302 has been modified and now meets at least one operational requirement 306 of the service 304.

Figure 4:
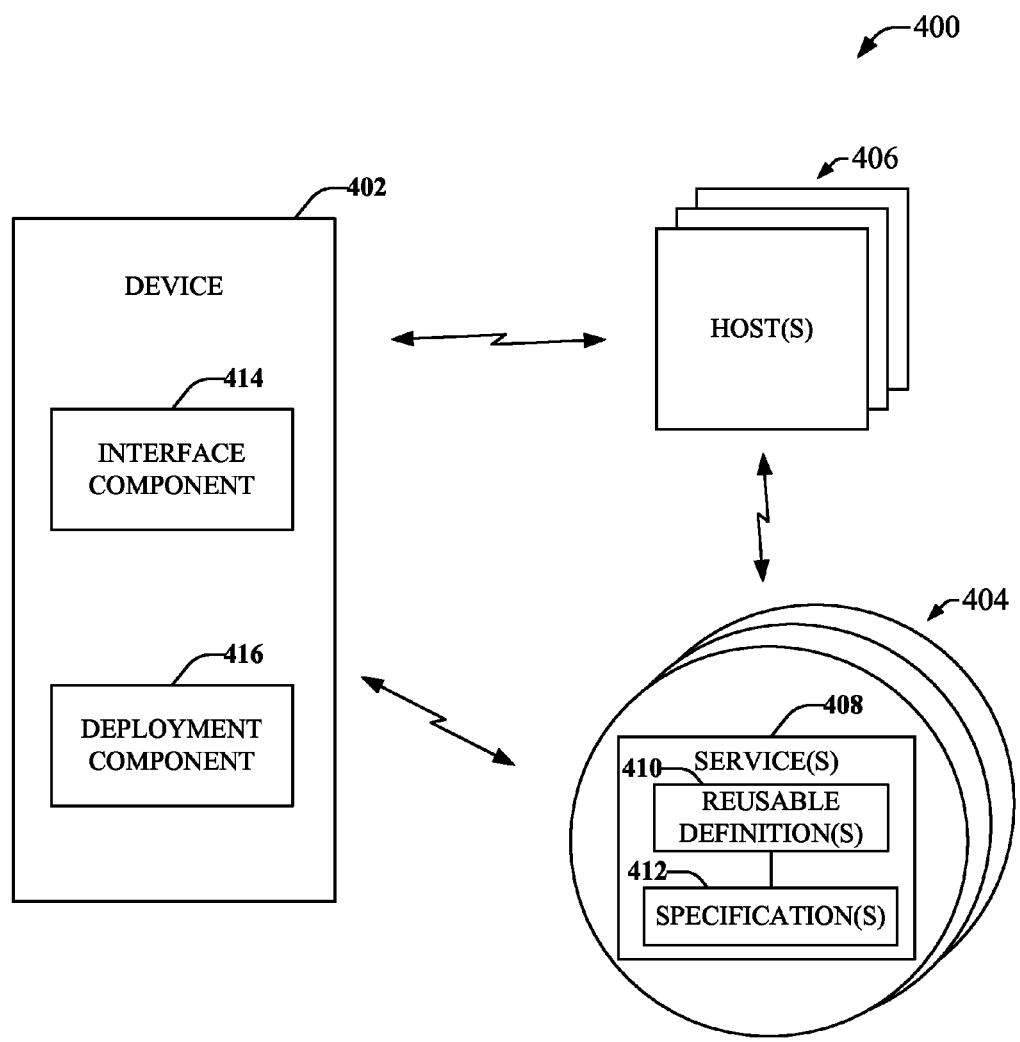
FIG. 4 illustrates an industrial control system that supports multiple platform configurations, according to an aspect.

FIG. 4 illustrates an example industrial control system 400 that supports multiple platform configurations, according to an aspect. Support of multiple interfaces associated with multiple services and related platform configurations enables grouping and namespace separation. Multiple platform configurations can also support visibility controls, which can allow different users access to different sets of controls and objects. Platform configurations can be tagged to provide different functionality depending on the intended use of the platform configurations. Multiple platform configurations also enable scalable updating. Traditionally, the entire industrial control system is updated in response to changes in implementation of one or more of software, hardware, or firmware, necessary to operate the industrial system. However, with the one or more disclosed aspects, service(s) and associated platform configuration(s) are decoupled, which allows individual platform configurations to be revisioned (e.g., updated) separately. The decoupled platform configuration(s) allow each platform configuration to be reused with different implementations (e.g., implementation of software or firmware) and objects. Additionally or alternatively, the platform configuration can reuse specific methods in which reusable definitions contain only the definitions of operation. This is a more granular approach than the approach traditionally performed (e.g., where whole services are reused).

Included in industrial control system 400 is a device 402 that interacts with multiple platform configurations 404. Each of the different platform configurations 404 can be utilized with different host(s) 406 within the industrial control system 400 (or within a related architecture). In accordance with some aspects, a single host 406 is utilized with multiple platform configurations 404. Although various aspects herein illustrate connections between device 402, platform configurations 404, and host(s) 406 as wireless links, according to some aspects, the links can be wireline links, or both wireless and wireline links.

The multiple platform configurations 404 can include one or more services 408 associated with one or more reusable definitions 410 and/or one or more specifications 412. In accordance with some aspects, different platform configurations 404 can use a common service 408, a common reusable definition 410, a common specification 412, or combinations thereof. Each component (e.g., service, reusable definition, specification) of the platform can be located anywhere within an industrial control system 400 and does not need to be co-located with other components of the platform and/or the host(s) 406.

Device 402 comprises an interface component 414 that is configured provide a set of functional connections and controls for various automated host implementations, wherein the automated host implementations are configured to interact with a plurality of platform configurations. In accordance with some aspects, the automated implementation of the host is execution of a service that comprises a reusable definition and a specification. Interface component 414 can provide a mechanism for interaction between a user and/or entity (e.g., the Internet, another system, a computer, and so on, hereinafter referred to as user), the one or more hosts 406, and the multiple platform configurations 404. For instance, the interface component 414 can be, but is not limited to being, a keyboard, a mouse, a pressure-sensitive screen, a graphical user interface, a microphone, and voice recognition software. In accordance with some aspects, the one or more hosts 406 and the device 402 can be in separate locations within the industrial control system 400 or another location (e.g., satellite plant, vendor location, client location, and so forth).

In accordance with some aspects, device 402 is configured to be utilized for one host 406, wherein the device 402 is independent of the implementation and is transparent to the end user. In such a manner, device 402 can be reused on multiple hosts that are functional equivalents but that may have fundamental underlying differences. Thus, logic can be implemented in different languages, different software bases, and so forth.

Also included in device 402 is a deployment component 416 that is configured to support a plurality of platform configurations 404. Deployment component 416 can be configured to enable a second platform configuration from a set of alternative platform configurations. Further, the deployment component 416 can be functionally independent of the platform configurations 404. For example, deployment component 416 can be configured to be reused on multiple platform configurations that are functional equivalents, but have underlying differences. For example, at least one multiple platform configuration can have a different programming language than at least one other of the multiple platform configurations. However, even though the platform configurations have different programming languages, the deployment component 416 is configured to support both languages and, therefore, both platform configurations. In accordance with some aspects, deployment component 416 does not support each individual language but instead utilizes a high-level programming code that can interface with multiple programming languages without being programming language specific.

Additionally or alternatively, deployment component 416 can be configured to support platform configurations having different implementations. For example, one implementation can be in an industrial automated controller and a second implementation can be in a software system. The support of different implementations can allow an end application to be indifferent or unbound to a current implementation on another end application.

According to some aspects, deployment component 416 can be configured to capture a command or action regardless of how the command or action is used. For example, an action might be that if a certain condition occurs, an alarm (e.g., a specification) is activated. A similar specification (e.g., alarm) can be employed when a different event occurs. Even though a similar specification (e.g., alarm) is used in both cases, the deployment component 416 allows the reusable definition to interact with the specification (e.g., alarm) even though the specification is being utilized differently by two different automated host implementations.

In accordance with some aspects, deployment component 416 can aggregate one or more services 408, one or more reusable definitions 410, and/or one or more specifications 412. The aggregation can include identifying two or more services, two or more reusable definitions, and/or two or more specifications that are similar and determining that the similar services, reusable definitions, and/or specifications can be aggregated or utilized interchangeably. In accordance with some aspects, deployment component 416 aggregates based at least in part on a language requirement of an implementation of the at least one service. According to some aspects, deployment component 416 aggregates based at least in part on metadata related to an implementation of the at least one service. In some aspects, deployment component 416 aggregates based at least in part on an analysis of the at least one of a plurality of capabilities. In additional or alternative aspects, deployment component 416 aggregates in response to definition of user-specific configuration of industrial control system 400.

Aggregation of a group of services results in a composite service, or composite object. The composite service includes at least one interface from each of the services in the group of services. As indicated supra, deployment component 416 can aggregate the group of services. In addition, in certain embodiments, deployment component 416 can manage the at least one interface of each of the services in the group of services. The management can be effected in accordance with two approaches: (1) Compact. The set of interfaces spanned by the at least one interface of each of the services in the group of services can form the composite service with a single, compact interface associated with the composite service. In this approach, at least a sub-set of one or more interface(s) in the set of interfaces are hidden and not available to users (machine or human agent) disjointedly from, or outside, the composite service. (2) Loose. Each interface in the set of interfaces spanned by the at least one interface of each of the services in the group of services is transferred intact into the composite service. Such set of interfaces embody the interface of the composite service; the composite service retains the interface(s) in the set of interfaces as individual entities. Each interface can be exposed as part of formation of the composite service, but remains hidden otherwise.

Figure 5:
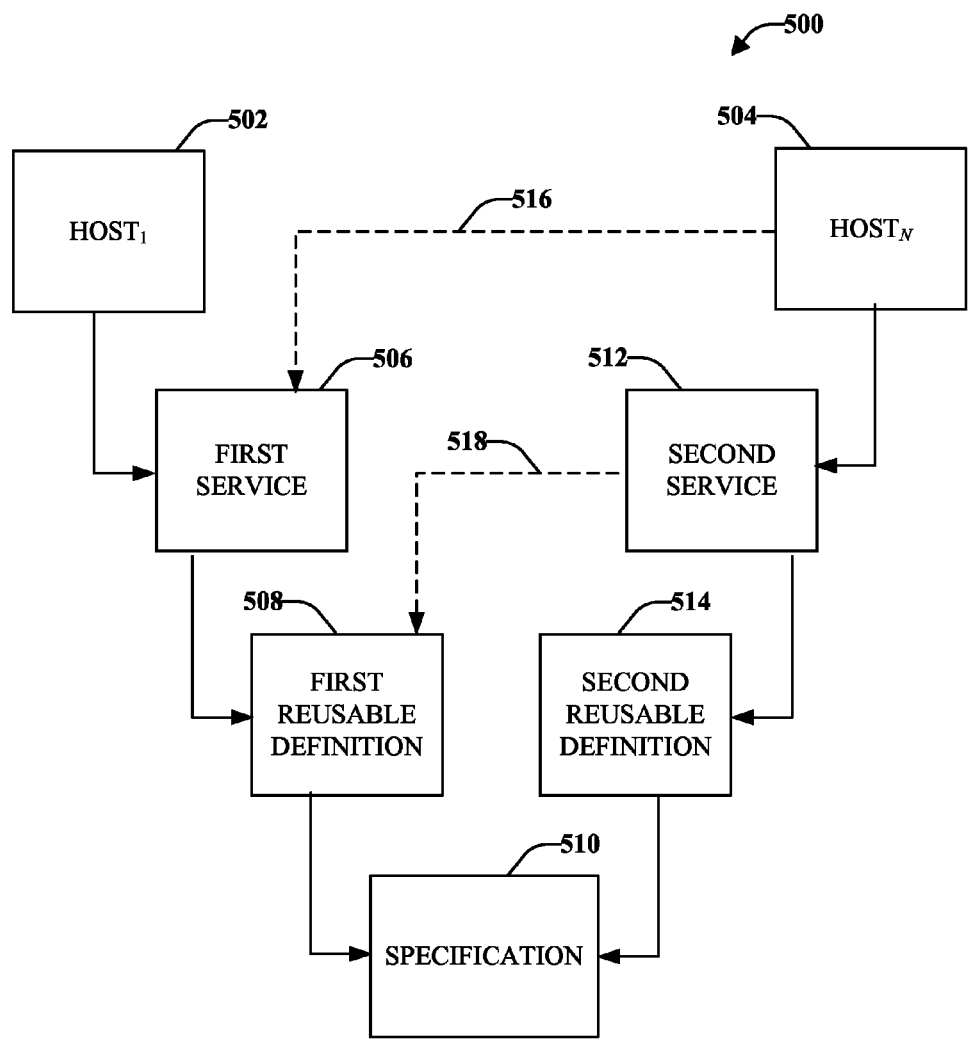
FIG. 5 illustrates a schematic representation of an example group of alternative platform configurations, according to an aspect.

In order to visualize a group of alternative platform configuration possibilities and/or aggregation of at least a portion of platform configurations, FIG. 5 illustrates a schematic representation 500 of an example group of alternative platform configurations, according to an aspect. Illustrated in the schematic representation 500 are multiple hosts, labeled Host$_1$ 502 and Host$_N$ 504, where N is an integer equal to or greater than one. Host$_1$ 502 can utilize a first service 506, which utilizes a first reusable definition 508, which utilizes a specification 510 (e.g., creating a platform configuration that comprises service 506, reusable definition 508, and specification 510). In a similar manner, Host$_N$ 504 can utilize a second service 512, which utilizes a second reusable definition 514, which utilizes the specification 510. However, in accordance with some aspects, another possibility for a platform configuration is that Host$_N$ 504 can utilize first service 506 as indicated at 516. In a similar manner, Host$_1$ 502 can alternatively utilize second service 512. Further second service 512 might alternatively utilize first reusable definition 508, as indicated at 518. In a similar manner, first service 506 might alternatively utilize second reusable definition 514. In accordance with some aspects, a host might utilize more than on service, more than one reusable definition, one or more specifications, or combinations thereof.

Figure 6:
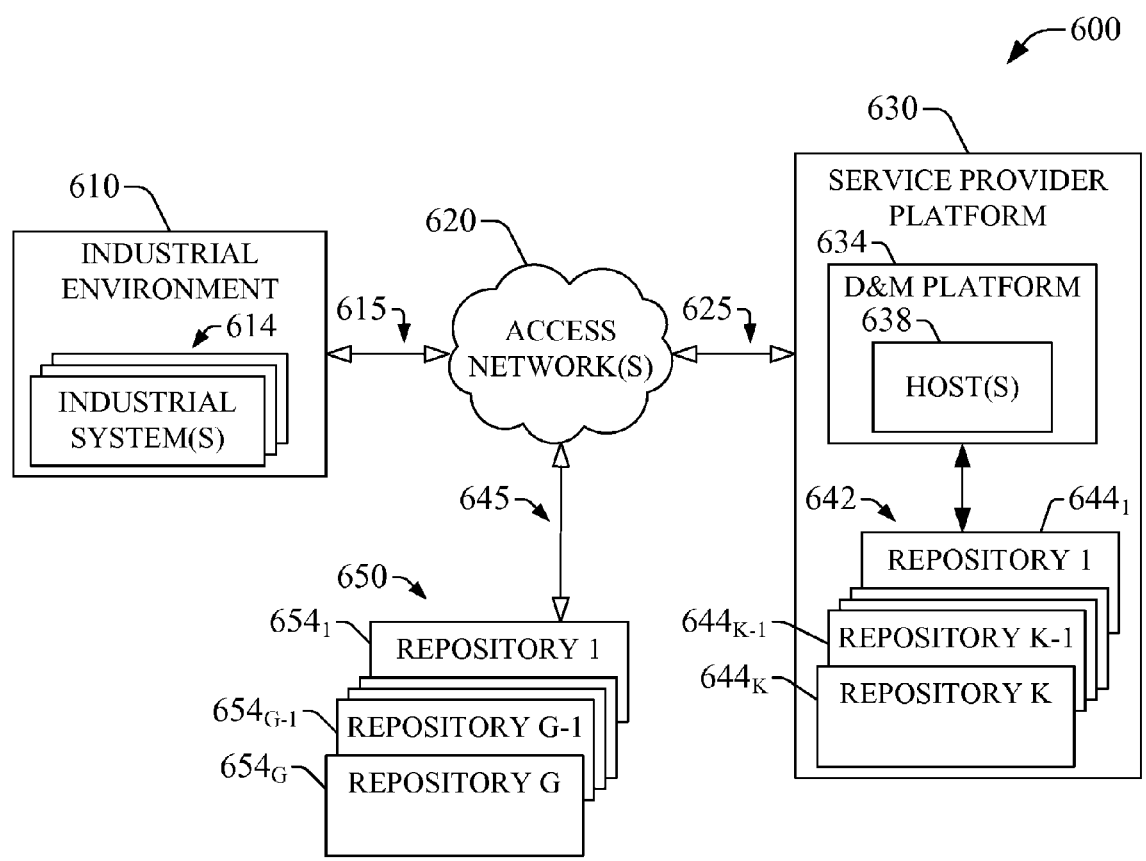
FIG. 6 illustrates an example system that enables management and development of at least one industrial system in accordance with aspects described herein.

FIG. 6 is a block diagram that represents an example system 600 that enables management and development of at least one industrial system in accordance with aspects described herein. Management can include delivery of intelligence (data, report(s), prediction(s), etc.) related to operation of the industrial automation system, implementation of operation and maintenance (O&M) procedure(s), or the like. Development can includes design of at least a portion of the industrial automation system, identification of commercial opportunities for a service provider that operates the platform, identification of issues related to operation of the industrial automation system and implementation of solution for such issues, etc.

The at least one industrial system can be part of an industrial environment 610 comprising a set 614 of one or more industrial system(s). Industrial environment 610 can have a localized architecture or a distributed architecture. In a localized architecture, the set 614 of one or more industrial system(s) are part of a geographically localized industrial environment 610. In an aspect of such localized architecture, the set 614 of one or more industrial system(s) constitute one of a single operational unit with a collective functionality (e.g., manufacturing); the operational unit can be, for example, a fabrication plant, a hydroelectric generation plant, a goods distribution site, a deep-water oil extraction site, or the like; different industrial system(s) within the set 614 embody different parts of the single operational unit. In a distributed architecture, the set 614 of one or more industrial system(s) are part of a geographically distributed industrial environment 610. In an aspect of the distributed architecture, the set 614 of one or more industrial system(s) constitutes a plurality of operational units, with each of the operational units in the plurality having a specific collective functionality; the plurality of operational units can be, for example, a group of fabrication plants, a group of hydroelectric generation plants, a set of goods distribution sites, a group of deep-water oil extraction sites, or the like.

For a localized architecture or a distributed architecture, industrial system(s) in industrial environment 610 are functionally coupled to a service provider platform 630 through access network(s) 620 via communication interfaces 615 and 625. A service provider can be an OEM, a parts supplier, a telecommunication carrier, an information technology (IT) supplier (e.g., a data storage service), or the like. In certain embodiments, the industrial system(s) in industrial environment 610 also can be functionally coupled (e.g., communicatively coupled) to the set 650 of repositories 654$_1$-654$_G$, where G is a natural number greater than or equal to unity (1); access network(s) 620 and communication interfaces 615 and 645 enable such functional coupling. In addition to enabling exchange of information (data, signaling, etc.) amongst the industrial system(s) and service provider platform 630, access network(s) 620 can enable exchange of information (data, signaling, etc.) amongst service provider platform 630 and the set 650 of repositories 654$_1$-654$_G$. In an aspect, repositories 654$_1$-654$_G$ can be part of one or more service provider platforms disparate from service provider platform 630. In another aspect, communication interfaces 615, 625, and 645 can include network adaptor(s), port(s), reference link(s), wired link(s), wireless link(s), or the like Access network(s) 620 can be geographically distributed and can include one or more of wireline network(s) or wireless network(s) that can operate in accordance with one or more communication protocols—for example, packet-based protocols such as internet protocol (IP), transmission control protocol (TCP), Ethernet, Ethernet TCP/IP, Control and Information Protocol (CIP) also referred to as Ethernet/IP, X.25, Asynchronous Transfer Mode (ATM) protocol, frame-based protocols such as frame relay, and circuit-switched protocols. In an aspect, access network(s) 620 can include service network(s) and control network(s). Service network(s) can include at least one network (wireless or otherwise) that is local to industrial environment 600 and enables communication of data amongst a plurality of industrial system(s) of set 614 or within one industrial system within the set 614. Data exchanged, or communicated, through the at least one network of service network(s) comprises various data structures related to management data (e.g., plant planning data), graphic data, control data, control logic, manufacturing data (e.g., process recipes), or metadata related to one or more variables associated to the various data structures. In addition, service network(s) can include at least one network (wireless or otherwise) that is external to industrial environment 600; for example, the at least one network can be a cellular telecommunication network (Universal Mobile Telephone System (UMTS) network, Long Term Evolution (LTE) network, etc.). Control network(s) within access network(s) 620 primarily administer control data and data transactions related to a control environment Implementation distinction amongst service network(s) and control network(s) in access network(s) 620 can enable improved integration of various functional elements (component(s), system(s), platform(s), equipment, etc.) within example industrial environment 610: For example, different parts of the control environment can be linked through custom or legacy control network(s), while exchange of information amongst the control environment and other network elements, such as a server in an enterprise network layer (e.g., back-end system, such as an Enterprise Resource Planning (ERP) system), can be implemented through non-proprietary service network(s), such as an Ethernet network. It should be appreciated that in one or more embodiments, the service network(s) and the control network(s) are both embodied in the same physical network.

Service provider platform 630 includes a design and management (D&M) platform 634 that utilizes intelligence acquired (received, retrieved, etc.) from an industrial system within industrial environment 610 or a disparate service provider platform in order to develop and manage the industrial system in accordance with aspects described herein. One or more host(s) 638 can utilize the acquired intelligence (data, metadata, signaling, etc.). The intelligence comprises at least one of data, metadata, signaling, or combination(s) thereof, related to deployment and operation of the industrial system within the industrial environment. D&M platform 634 can process the intelligence in response to at least acquisition of such intelligence from an industrial system. D&M platform 634 can analyze, aggregate, or learn from, the acquired intelligence. Based at least on result(s) of processing such intelligence, D&M platform 634 can supply information related to operational condition(s) of the industrial system, update(s) required for satisfactory operation of the industrial system (e.g., operation with data integrity, equipment integrity, or operator integrity), opportunities for improvement of the operational condition(s), or the like. In addition, based at least on such result(s) and customer policy established by an administrator (owner or lessee) of the industrial system, D&M platform 634 can configure at least one operational feature of the industrial system. D&M platform 634 is coupled to a set 642 of repositories 644₁-644_K, where K is a natural number greater than or equal to unity (1); such repositories can retain acquired data or payload data that is part of acquired signaling. D&M platform 634, via one or more of host(s) 638, for example, can access one or more memories that are part of industrial system(s) 614.

D&M platform 634 can acquire intelligence actively (referred to herein as active mode) or passively (referred to herein as passive mode), based on the entity that initiates acquisition of intelligence. The intelligence (data, metadata, signaling) that D&M platform 634 acquires in active mode generally is different from the intelligence it acquires in passive mode. D&M platform 634 retains intelligence collected actively or passively in at least one of repositories in set 642. In active mode, a host in the one or more host(s) 638 retrieves (e.g., downloads) the intelligence (data, metadata, signaling, etc.) from an industrial system within industrial environment 610. As part of active acquisition, the host in the one or more host(s) 638 can retrieve the intelligence in response to occurrence of a predetermined event related to the industrial environment 610. Examples of predetermined events are the following: commissioning of a revision to software application(s) or firmware application(s) employed by at least one industrial system, or one or more components thereof; commissioning of a functional element (e.g., a controller, an electronic operator interface (EOI), a tool, a sensor . . . ) that can be installed in the industrial environment 610; scheduled time for delivery of updates for software application(s) or firmware application(s) employed by at least one industrial system, or one or more components thereof; implementation of monitoring of the industrial environment 610 or an industrial system thereof, for example, the monitoring can be part of collection of data associated with acceptance phase(s) of the industrial system; or response to a directive (or other signaling) to collect intelligence, the directive received from a user device associated to an agent (human or machine) that operates D&M platform 634. An event related to the industrial environment 610 and that initiates acquisition of intelligence can be configured, or defined, by the service provider that administers service provider platform 630. In passive mode, a host of the one or more host(s) 638 receives the intelligence from an industrial system within industrial environment 610. The industrial system can convey the intelligence in response to at least one of a predetermined event related to the industrial environment 610 or a query generated by the industrial system. The query can be related to availability of hardware upgrades or software updates (recommended upgrade, recommended downgrade, patch(es), etc.) Examples of such predetermined events are the following: deployment of a functional element (component, system, platform, equipment, etc.) in the industrial environment 610, wherein deployment includes installation, testing, acceptance, etc.; change of state (transition from non-alarmed state to alarmed state, for example) of at least one industrial system, or one or more components thereof, of the industrial environment 610; configuration (e.g., creation, modification, deletion) of a policy that regulates access from an agent (human or machine) external to the industrial environment 610.

As described supra, industrial environment 610 can have a localized architecture or a distributed architecture. D&M platform 634 can acquire (actively or passively) information from a localized architecture and a distributed architecture. To at least such end, D&M platform 634 can exploit a logical representation of an industrial system; the logical representation comprises a group of functional blocks, wherein a functional element (e.g., a host, an interface component) in a functional block is uniquely identified through a logical address (e.g., an IP address or a Universal Resource Identifier (URI)), which also can convey physical location of the functional element. In certain embodiments, the logical address also can include metadata, such as a name field and related value. In an aspect, logical address(es) can be assigned by at least one addressing host (not shown) that is part of or is functionally coupled to the industrial system. The addressing host (e.g., a Domain Name Server) can exploit conventional addressing protocols, such as IP, CIP/Ethernet, or the like, or proprietary addressing protocols. In addition, a functional element (e.g., a host, an interface component) can be associated with a reusable definition which specifies at least one of a functional feature of the functional element, a condition (e.g., a requirement or a preference) for operation of the functional element. In certain embodiments an administration host (e.g., a web server; not shown) can enable configuration (e.g., creation, modification, deletion) of at least one reusable definition. As part of such configuration, the administration host (not shown) can link the at least on reusable definition to the logical address that uniquely identifies the functional element. Moreover, the administration host (not shown) can supply one or more reusable definition(s).

Figure 7:
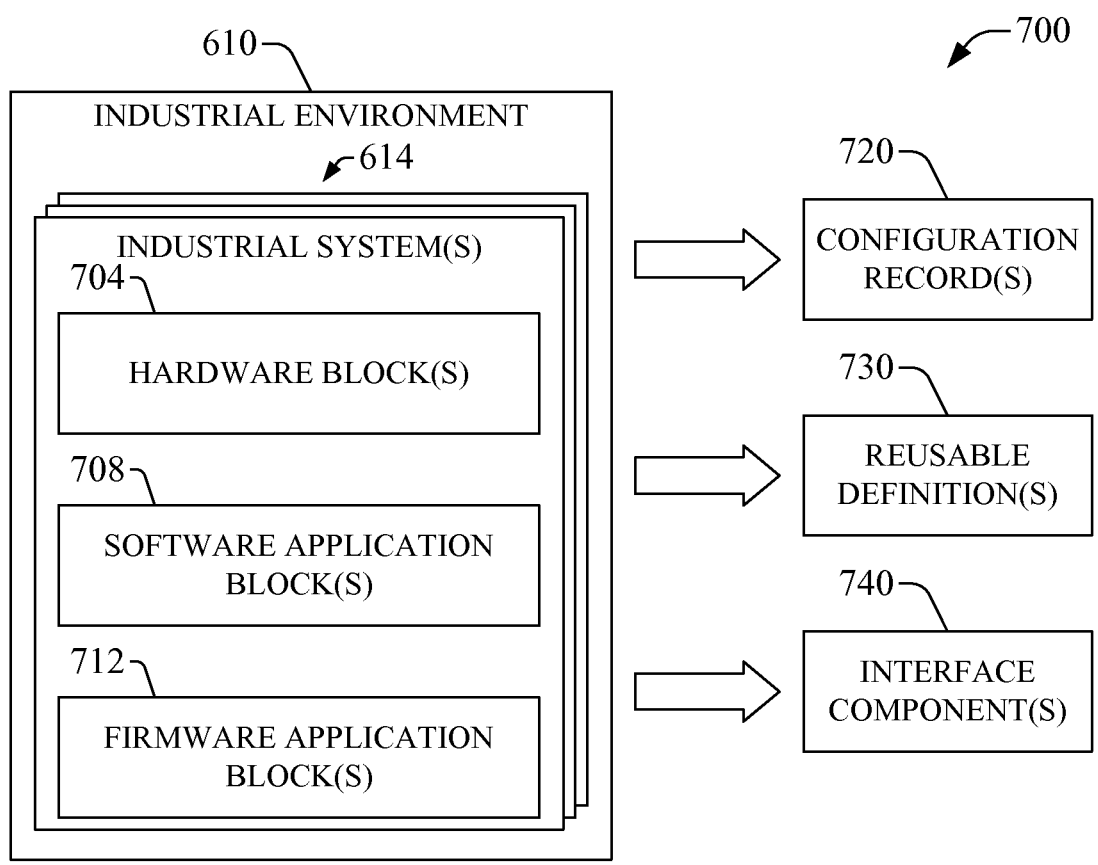
FIG. 7 represents an example embodiment of an industrial environment in accordance with an aspect described herein.

As an illustration, FIG. 7 presents a block diagram of an example embodiment 700 of an industrial environment 610 in which industrial system(s) are partitioned into blocks of functionality in accordance with an aspect described herein. An industrial system in the set 614 is partitioned into a group of three sets of functional blocks: One or more hardware block(s) 704, one or more software application block(s) 708, and one or more firmware application block(s) 712. The one or more hardware block(s) 704 include hardware host(s) (e.g., tool(s), equipment, etc.) can be arranged into different sub-blocks (e.g., various parts of tool(s)) in accordance with complexity of functionality of the hardware host(s). The one or more software application block(s) 708 comprise at least one service, wherein the at least one service is embodied in at least one group of one or more sets of computer-executable code instructions. The one or more software block(s) 708 are associated with the one or more hardware block(s) 704. In addition, the one or more software application block(s) 708 also can be arranged into a plurality sub-blocks; a sub-block of the plurality can represent a service associated with at least one sub-block of the one or more hardware block(s) 704. The one or more firmware application block(s) 712 also are associated with at least one block of the one or more hardware block(s) 704.

A set 720 of one or more configuration record(s) that characterizes one or more functional elements (e.g., host(s), equipment, software application(s), etc.) in hardware block(s) 704, software application block(s) 708, and firmware application block(s) 712 can be supplied, for example, to D&M platform 634. The set 720 of configuration records can include (i) data indicative of identity (ID) (e.g., a version record, a serial number) and provisioning time or activation time of a functional element (e.g., a host, equipment, a software application) within the industrial system—in certain scenarios, the data can be accompanied of related metadata; (ii) operational importance of the functional element; (iii) location within the industrial system of the functional element; (iv) security profile(s) of the industrial system, wherein the security profile includes security setting(s) of one or more functional elements within the industrial system, the security setting(s) can establish, for example, acceptable security protocol(s) (e.g., protocol-based tunnel connectivity (e.g., virtual private network (VPN)), on-site credential-token validation) to access the one or more functional elements; or the like. In certain embodiments, configuration record(s) 720 also can include at least one view of a database or other data storage that retains information (data, metadata, etc.) related to various assets of industrial system(s) 614. The various assets can comprise (e.g., service level agreement(s), purchase order(s), intellectual property asset(s) (patent(s), trademark(s), licensing agreement(s), etc.). Additional configuration records that characterize at least one functional element (e.g., a host) of an industrial system can be cast as one or more reusable definition(s) 730 or one or more interface component(s) 740.

In the subject disclosure, an interface component of the one or more interface component(s) 740 can be associated with a modular object, which can be either a hardware object or a software object. The interface component can be defined by a specification that includes information such as data, metadata, data type(s), code instructions, service profile(s), service procedure(s), or the like; such information defines the functionality of the interface component. The specification is an abstraction of the functionality of the interface component; such functionality is dictated, at least in part, by one or more functional features. The abstraction enables decoupling the functionality of the interface component from structure (e.g., hardware structure or software structure) that enables such functionality. Accordingly, the abstraction is agnostic with respect to implementation of the functionality (e.g., one or more functional features) of the interface component. At least one advantage of decoupling the functionality of the interface component from related structure is that the interface component can be represented in terms of its functionality rather than details related to structure and, thus, such functionality can be implemented in one or more structures.

In certain embodiments, a functional block can be represented by a set of layers of functionality, wherein the set of layers can be arranged in accordance with functional complexity of functional element(s) that comprise each layer of the set of layers. Each layer of the set of layers includes at least a physical layer and a logical layer. The physical layer comprises functional elements that are hardware, whereas the logical layer includes (1) at least one group of definitions (e.g., reusable definitions) that characterizes functionality of at least one functional element in the physical layer, and (2) at least one group of services that implements functionality (e.g., one or more functional features) of the at least one functional element in the physical layer. The logical layer can be retained in storage functionally coupled (e.g., communicatively coupled) to one or more functional elements (e.g., host(s)) within the physical layer. For certain functional elements in the functional layer, one or more memory elements that compose the storage can be part of such functional elements. For alternative functional elements in the physical layer, one or more memory elements can be external to such functional elements and functionally coupled thereto. In an aspect, the storage that retains the logical layer can be represented by a storage layer.

Figure 8:
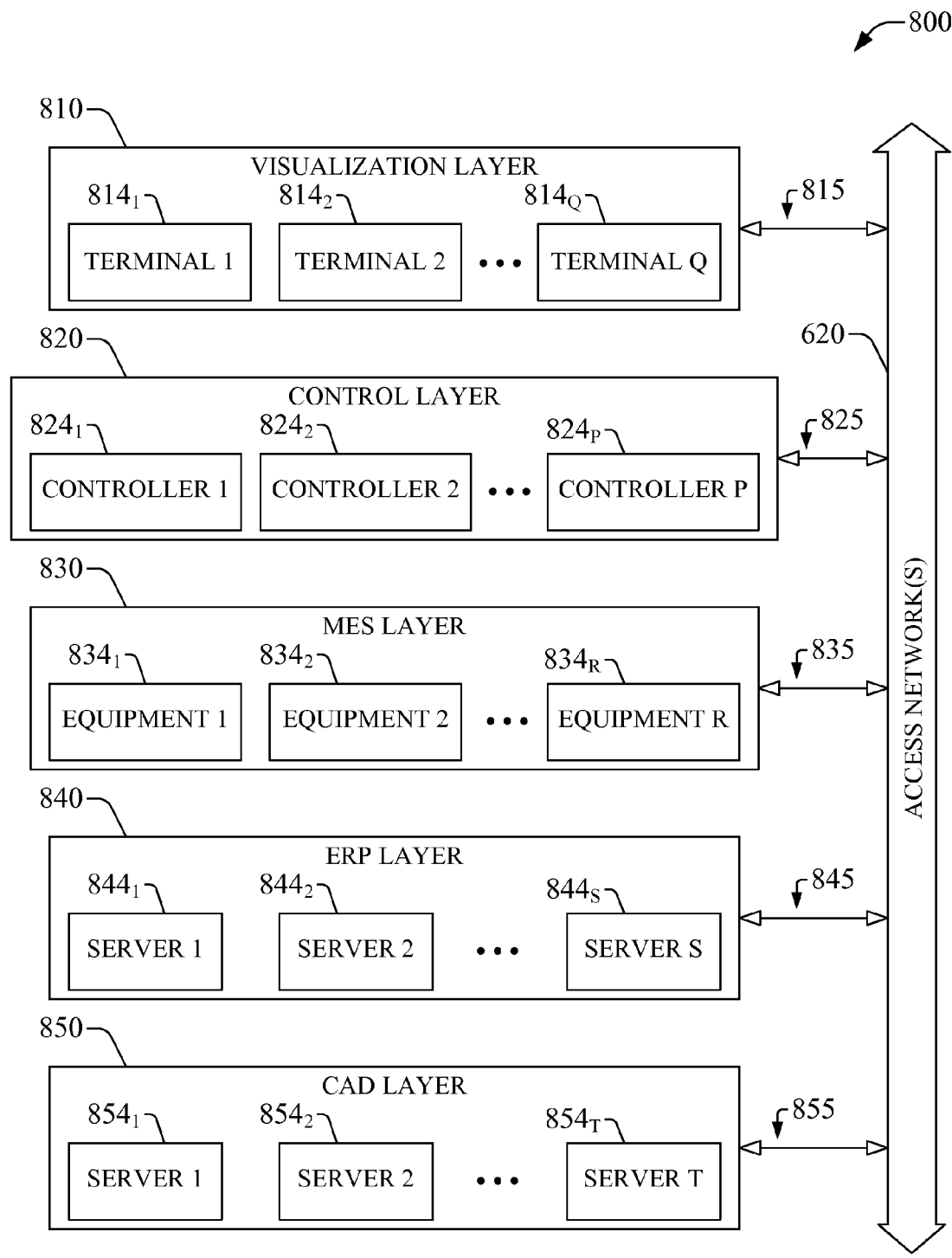
FIG. 8 illustrates an example industrial environment that exploits management and development of at least one industrial system in accordance with aspects described herein.

As an illustration of a layered architecture, FIG. 8 represents an example industrial environment 800 that can exploit management and development of at least one industrial system in accordance with aspects described herein. The example industrial environment 800 includes five layers: Visualization layer 810, control layer 820, Manufacturing Execution System (MES) layer 830, Enterprise Resource Planning (ERP) layer 840, and Computer-Assisted Design (CAD) layer 850. Layers 810-850 are mutually functionally integrated (e.g., communicatively coupled) via access network(s) 805 and communication interfaces 815-855. Communication of information (data, metadata, signaling, etc) within each layer in example industrial environment 800 also is accomplished through access network(s) 805 and interfaces 815-855. In an aspect, for communication purposes, and related exchange of data or signaling, each layer in the set of layers 810-850 operates as a single logical unit. Thus, communication amongst disparate layers is carried out in the same or substantially the same manner irrespective of geographical location of host(s) (e.g., terminal(s), electronic operator interface(s), controller(s), server(s), device(s), tool(s), database(s)) within the layers that exchange data.

In addition, a component in a local functional element (e.g., HMI or terminal) can access data available in the local functional element in the same or substantially the same manner as data available in a remote terminal (e.g., a remote HMI or terminal). While each layer in example industrial environment 800 operates as a single logical unit for purposes of exchange of data or signaling, each layer in the set of layers 810-850 can include one or more functional elements associated with disparate operational environments (e.g., control environments in a control layer) and thus disparate portions of a single logical unit can operate under disparate requirement(s) or specification(s).

Visualization layer 810 includes a set of Q terminals $814_1$-$814_Q$, with Q a natural number greater than or equal to unity. The set of Q terminals $814_1$-$814_Q$ can embody the physical layer of visualization layer 810. Terminal $814_\lambda$, with $\lambda=1, 2 \ldots Q$, renders control data; terminal $814_\lambda$ can be embodied in a dedicated HMI or electronic operator interface (EOI) or in a computer, such as a desktop computer, a mobile computer, a smartphone, that can render control data. In an aspect, visualization layer 810 can be homogeneous and composed of networked workstations. In another aspect, visualization layer 810 can be heterogeneous, with terminals $814_1$-$814_Q$ comprising a group of desktop computers, a group of workstations, and a group of dedicated HMIs; where HMIs in the group can have disparate functionality and can include legacy HMIs. In the embodiment in which the visualization layer 810 is heterogeneous, disparate sub-layer can be configured in accordance with operational complexity (e.g., capabilities) of the various terminals that comprise the visualization layer 810.

Visualization layer 810 and control layer 820 are functionally coupled (e.g., communicatively coupled) through access network(s) 805. One or more terminals in the set of terminals $814_1$-$814_Q$ render control data generated in control layer 820. In the illustrated embodiment, control layer includes P controllers $824_1$-$824_P$, with P a natural number greater than or equal to unity (1). In one or more embodiments, controllers $824_1$-$824_P$ can be industrial controllers or industrial automation controllers. A controller in control layer 820 can be embodied in one of a programmable logic controller (PLC), a PC-based controller, etc. Each of the controllers $824_1$-$824_P$ includes processor(s) (not shown), volatile memory and non-volatile memory (not shown), and other circuitry (not shown) that enables implementation of control process(es) (e.g., execution of control logic, or control code instructions) related to a specific control environment (not shown in FIG. 8).

Controllers $824_1$-$824_P$ and terminals $814_1$-$814_Q$ can be linked through a one one-to-many relationship or a one-to-one relationship. Terminals $814_1$-$814_Q$ and controllers $824_1$-$824_P$ can be distributed in disparate geographic locations.

Accordingly, disparate functional elements of access network(s) 805 enable communication, and related exchange of data or signaling, amongst two or more terminals located in disparate geographic regions. In addition, such functional elements of access network(s) 805 can enable communication, and related exchange of data or signaling, amongst two or more controllers that reside in disparate geographical locations.

Control layer 820 and MES layer 830 also are functionally coupled (e.g., communicatively coupled) through access network(s) 805. It should be appreciated that in alternative or additional embodiments of example industrial environment 800, the MES layer 830 can be substituted or supplemented with a generic equipment layer (not shown). MES layer 830 includes R controllers $824_1$-$824_R$, with R a natural number greater than or equal to unity (1). At least one controller in control layer 820 can regulate operation of one or more equipment (e.g., equipment 1 $834_1$ and equipment R $834_R$) in MES layer 830. In MES layer 830, equipment includes associated process(es)—industrial process(es), manufacturing process(es), measurement process(es) in a laboratory, infrastructure development process(es), such as oil and gas prospecting and extraction, etc. Equipment in MES layer 830 is specific to a market space (e.g., beverages, edible goods, textile goods, oil and gas . . . ) and can include one or more sets of tools, a group of machines, numerous systems and related sub-systems, real estate and associated infrastructure, and so forth.

In example industrial environment 800, CAD layer 850 can embody a design environment for visualization layer 810 and control layer 820. Accordingly, CAD layer 850 can embody a specification domain, which overlaps with an implementation domain—visualization layer 810 and control layer 820 embody, at least in part, the implementation domain. CAD layer 850 includes a set of T servers $854_1$-$854_T$, with T a natural number greater than or equal to unity (1). At least one server in the set of T servers $854_1$-$854_T$ enables to compose a specification, or contract, that defines an interface component (not shown) for one or more terminals in the set of terminals $814_1$-$814_Q$. In addition or in the alternative, a server in the set of T servers enables to compose a specification that defines an interface component (not shown) for at least one controller in control layer 820.

In addition, in example industrial environment 800, Enterprise Resource Planning (ERP) layer 840 also is coupled to visualization layer 810, control layer 820, and MES layer 830 via access network(s) 805 and communication interfaces 815, 825, 835, and 845. ERP layer 840 includes a set of S servers $844_1$-$844_S$, with S a natural number greater than or equal to unity (1). At least one server in the set of S servers $844_1$-$844_S$ enables to compose a specification, or contract, that defines an interface component (not shown) for one or more terminals in the set of terminals $814_1$-$814_Q$. In addition or in the alternative, a server in the set of S servers enables to compose a specification that defines an interface component (not shown) for at least one controller in control layer 820.

As described supra, for communication purposes, and related exchange of data or signaling, each layer operates as a single logical unit; communication amongst disparate layers (e.g., control layer 820 and MES layer 830) is carried out in the same or substantially the same manner irrespective of geographical location of the functional elements (e.g., controller P $824_P$ and equipment 2 $834_2$) that exchange data or signaling. In addition, a component in a local terminal (e.g., terminal P $814_1$) can access data available in the local terminal in the same or substantially the same manner as data available in a remote terminal (e.g., terminal $814_Q$). Similarly, data available in one or more controllers in control layer 820 appears logically the same to local terminal(s) and remote terminal(s) within visualization layer 810. As described supra, each layer in the plurality of layers 810-850 can include one or more functional elements associated with disparate execution environments (e.g., layers or respective portions thereof) and thus disparate portions of a single logical unit can operate under disparate requirement(s) or specification(s). The disparate portions can include a sub-set of interface components of a set of one or more interface component(s) that are part of the single logical unit.

Figure 9:
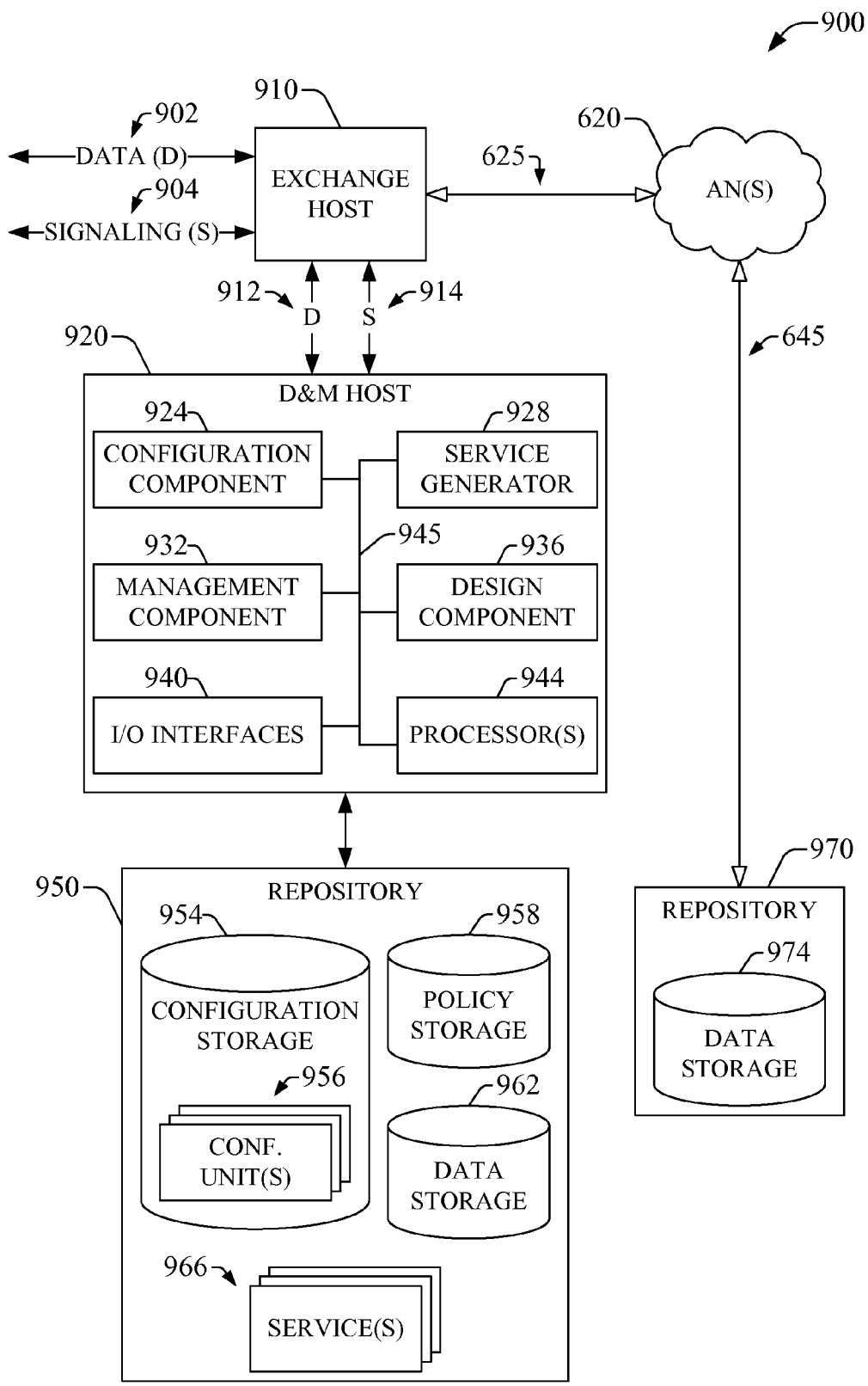
FIG. 9 illustrates an example embodiment of a platform and related repositories that enable various design and management features of the subject disclosure.

FIG. 9 is a block diagram of an example embodiment 900 of a D&M platform 634, and related repositories, that enable various features of the subject disclosure. An exchange host 910 can receive data (D) 902 from an industrial system (not shown in FIG. 9) of an industrial environment 610. Data 902 can include metadata and represents intelligence related to the industrial system. In active mode, data 902 can be received in response to request(s) for data delivered by exchange host 910 as part of signaling (S) 904; signaling 904 can be a relayed version of signaling 914 received by exchange host 910 from a D&M host 920. Thus, data 902 is retrieved by exchange host 910 from the industrial system (not shown). In passive mode, the industrial system conveys the data 902 without receiving a request therefor from exchange host 910.

Exchange host 910 can relay at least a portion of data 902 to D&M host 920. At least the portion of data that is relayed is indicated as data 912. In an aspect, data 912 can be a processed version (e.g., a reformatted version, a tagged version, or combination thereof) of data 902 that yields data in a suitable format for manipulation by D&M host 920; exchange host 910 can process incoming data 902 and produce data 912. Data 902 can convey a collection of configuration records of an industrial system. As described supra, at least a portion of the collection of configuration records can be cast as at least one of a group of one or more sets of reusable definitions (e.g., reusable definition(s) 720) or a set of specifications that define a set of interface components (e.g., interface component(s) 730). A specification that defines an interface component includes one or more of data, metadata, data type(s), service profile(s), service procedure(s), and the like. As described supra, data 912 can convey at least a portion of the collection of configuration records of the industrial system that supplies data 902.

Configuration component 924 acquires (e.g., receives) a set of one or more configuration records of an industrial system via data 912 and produces at least one configuration unit that conveys the set of one or more configuration records of the industrial system. The at least one configuration unit conveys functionality of the industrial system via, at least in part, a set of interface components that are part of the set of one or more configuration records. Configuration component 924 can record the at least one configuration unit within a set 956 of one or more configuration (conf.) unit(s). In an aspect, a configuration unit can be embodied in a data module, a file or file system, a set of registers, or the like. In an aspect, the at least one configuration unit includes at least one data structure, such as a data tree or relational table, wherein the at least one data structure characterizes logically the industrial system and conveys functionality thereof.

In an aspect, to produce the at least one data structure, configuration component 924 exploits a set of rules that dictate, at least in part, the manner in which the at least one data structure is to be constructed. The set of rules is specific to the industrial system related to the at least one data structure, and can be retained in policy storage 958. In addition, the set of rules can specify naming convention(s) for company that administers the industrial system; plant that includes the industrial system; organization that includes the industrial system; hierarchical level (operational, administrative, logic, etc.), within an organization; service associated with a configuration record; object within a service; functional feature of a service; and so forth. The naming convention(s) are configurable and extensible; an administrator (e.g., administration host) of the industrial system can configure at least one naming convention. At least one rule of the set of rules that defines a naming convention can be retained within a naming macro within policy storage 958. Moreover, the set of rules can determine constraints for composition of a service related to at least one configuration record from a plurality of two or more services; such service being a composite service. As an example of rules for service composition or aggregation, services of a first type (e.g., I/O service for automation control) can be parents to a child service of a second type (e.g., I/O service for collection of data from a sensor in an automation control system). In an aspect, naming convention(s) can be applied in accordance with the constraints for composition of service(s).

Configuration component 924 can generate a second configuration unit in response to an update (e.g., modification or deletion) of at least one configuration record of an industrial system for which a first configuration unit is available. The update can include modification of at least one dependency, or relationship, of the at least one configuration record. The second configuration unit is thus an update of the first configuration unit. As an example, configuration component 924 can generate the second configuration unit if a version of a functional element in a hardware block, software block, or firmware block, or related layers, is different from the version of the functional element (a host, a software application, equipment, etc.) as recorded in the first configuration unit. As another example, configuration component 924 can create the second configuration unit if a functional element is added to or removed from the industrial system related to the first configuration unit. As yet another example, if a specification of an interface component in the industrial system related to the first configuration unit is modified (e.g., visibility metadata and related data are revised), then configuration component 924 can generate the second configuration unit. In an aspect, configuration component 924 need not create the second configuration unit in full. Instead, configuration component 924 can create the second configuration unit in portions: The configuration component 924 replicates a portion of the first configuration unit in the second configuration unit, and creates or revises one or more data structures related to the configuration record that has been updated in the industrial system and adds the created or revised one or more data structures into the second configuration unit. Accordingly, configuration component 924 can retain a plurality of two or more configuration units that represent a single industrial system; different versions of configuration of the single industrial system can be retained.

Based on at least in part on received data 912 and generated configuration unit(s), service generator 928 can generate a set of interface services that exposes functionality associated with at least one configuration unit related to an industrial system. The functionality associated with the at least one configuration unit can be provided by at least one interface component in the at least one configuration unit; the at least one interface component is acquired through the received data 912. As described supra, functionality of the at least one interface component is determined by at least one specification that establishes, in part, a set of functional features of the at least one interface component. Acquisition of the at least one specification embodies acquisition of the at least one interface component via received data 912. To generate an interface service, service generator 928 acquires (retrieve, receive, etc.) the at least one specification that that defines the at least one interface component and, based on the at least one specification, service generator 928 can generate computer-executable programming code (e.g., a software application). In an aspect, service generator 928 can generate the computer-executable code automatically (e.g., without human intervention). In addition, service generator 928 can compile and link the service. Moreover, service generator 928 also can link the service to one or more libraries (or re-usable definitions) which can be retained in data storage 962 or other, dedicated storage (e.g., library storage; not shown) within repository 950. In certain embodiments, to generate the computer-executable programming code, service generator 928 can associate information (e.g., data, metadata, data type(s), code instructions, service profile(s), service procedure(s) . . . ) related to the at least one interface component and disclosed in the at least one specification with a set of computer-executable instructions. The service generator 928 can associate such information with the set of computer-executable instructions based at least on one or more mappings (not shown). The one or more mappings are configurable and extensible and can be defined by an administrator (owner or lessee) of the service provider platform 630 that contains D&M host 920. The set of computer-executable instructions are specific to a programming language employed to execute the service generated to implement the interface component and functionality thereof. The programming language can be one of a high-level language, such as Java™, Perl, Python, Delphi, Microsoft® Visual Basic, C#, C++, ladder logic, function chart, or the like; device or controller code language, e.g., Verilog; assembly code; or the like.

When implemented (e.g., executed) by a component or a processor that provides at least part of the functionality of the component, the set of interface services can produce an inventory of physical features (e.g., functional element(s) in a hardware block) that enable the functionality of the at least one interface component in the configuration unit associated with the industrial system. In addition, an interface service exposes functionality associated with an interface component in response to execution of the interface service; at least one processor (e.g., processor(s) 944) can execute the interface service. Likewise, the interface service can expose physical features that enable functionality of the interface component in response to execution of the interface service; at least one processor (e.g., processor(s) 944) can execute the interface service. The set of interface services is retained in repository 950, as part of a memory element (register(s), database(s), directory(ies), etc.) that retains one or more service(s) 966.

In an aspect, to expose functionality of a configuration unit, or at least one interface component therein, an interface service can generate at least one view of at least one data structure retained in a configuration unit of the set of configuration unit(s) 956. In certain scenarios, the interface service generates the at least one view in response to reception of signaling 914 that conveys occurrence of a predetermined event related to operation of the service platform 630. In alternative or additional scenarios, the interface service generates the at least one view in response to generation of or an update to a configuration unit in configuration storage 954. In another aspect, such view(s) can be logical view(s) that represent functional features disclosed in the at least one data structure; in an aspect, the functional features are decoupled from structure or a resource, such as a tool, a sensor, hardware, a server, a router, etc., that can enable the one or more of the functional features. In another aspect, such view(s) can be hardware views that disclose physical aspects of the industrial system characterized by the at least one data structure. In an embodiment, for example, exchange host 910 can be a web server that publishes a group of views generated as described supra.

Moreover, the interface service can generate the at least one view in response to a query received from an industrial system linked to at least one data structure of a configuration unit in the set 956 of one or more configuration unit(s). The interface service can convey the at least one view as part of data 912 to exchange host 910, which can deliver such view as part of data 902 in response to the query or other requests for configuration data related to the industrial system. As indicated supra, in certain embodiments, exchange host 910 can be a web server that hosts an update website which provides a view in response to query(ies). In certain scenarios, the update website can provide the view as part of a subscription service or on a pay-per-view basis, thus enabling generation of revenue for a service provider that administers (e.g., owns or leases) a D&M platform that includes the exchange host 910.

In example embodiment 900, D&M host 920 includes a management component 932 that can respond to a query from an industrial system. The query can be related to availability of an update for at least one functional element of the industrial system. The query can be received by exchange host 910 as part of signaling 904; the exchange host 910 can relay the query, with reformatting or without reformatting, to management component 932. In an aspect, to respond to a query related to availability of update(s) for a resource or a functional element in an industrial system, management component 932 can compare configuration record(s) of the industrial system with data associated with development of the resource or a functional element (hardware component, software component, firmware component, etc.). The configuration record(s) can be retained within at least one configuration unit in the set 956. Management component 932 can acquire the data associated with development of the functional element from data storage 962 in repository 950, or from data storage 964 within at least one repository 970 related to at least one disparate service provider platform; repository 960 can be at least one of repositories $654_1$-$654_G$. Configuration record(s) employed to respond to a query from an industrial system can be retrieved from the industrial system. Based at least on result(s) of the comparison, management component 932 can deliver a response to the industrial system that originates the query. The response can be a report that conveys whether update(s) are available for the functional element. The response can be delivered as part of data 902, and can be embodied in a report supplied in accordance with one or more communication formats (email communication, SMS communication, MMS communication, etc.). In addition or as an alternative, the response can be published in an update website hosted by the exchange host 912.

In addition or in the alternative to responding to a query, management component 932 can retrieve configuration record(s) from an industrial system of industrial environment 610 in order to generate an inventory of a current or last-known configuration of the industrial system with respect to a previous configuration thereof. As an example, the inventory can disclose a set of services that are currently utilized and compare the set of services to a disparate set of services utilized in a previous versions of the industrial system or parts thereof (functional element(s), resources, etc.) or at a specific instant since operation of the industrial system or the parts thereof began. The inventory can be directed to physical aspects of the industrial system or software aspects thereof; the physical aspects can be related to functional element(s) in a hardware block or a layer thereof, certain resources, and so forth. Generally, the retrieved configuration record(s) can be received as data (e.g., data 902) and can be routed to configuration component 924 for generation of a configuration unit; in an aspect, management component 932 can signal exchange host 910, via signaling 914, to route the retrieved data to configuration component 924. Management component 932 can retrieve the configuration record(s) as part of generation of a report related to operational condition(s) of the industrial system. The configuration record(s), and related data, can be retrieved in accordance with an access policy configured (e.g., defined and created) by an administration host or administration component of the industrial system. Exchange host 910 can receive the access policy as part of data 902, and can record the access policy in policy storage 958. In an embodiment, data that conveys the access policy as part of data 902 can be received from the industrial system. In another embodiment, exchange host 910 can enable a web-based user interface that allows creation of the access policy and recordation thereof in policy storage 958.

Additionally, in example embodiment 900, D&M host includes a design component 936 that can identify areas of operational improvement for an industrial system in industrial environment 610. An area of operational improvement includes update(s) to equipment (e.g., controller, EOI, workstation, tools, sensors, etc.), where the update(s) can be a software update (e.g., update to an operating (OS) release) or a hardware update(s) (e.g., newer version of equipment). Software update(s) also include update(s) to services utilized by the industrial system; the update(s) to service can include newer versions of services with increased functionality, improved performance, reduced complexity, or the like. Alternative or additional areas of operational improvement include update(s) to deployment configuration thereof. In general, an area of operational improvement (or area of improvement) as utilized herein refers to a product (resource, software application, firmware application, etc.) or service (billing service, information technology service, data management service, etc.) consumed by the industrial system that is or may be underperforming as established by a set of metrics defined by the service provider that issues the product or service, or is or may be operating outside specification established by standardization group(s) or industry regulators. The product can be, for example, one or more of a resource, a software application, a firmware application, whereas a service can be, for example, a billing service, information technology service, data management service, and so forth.

To at least identify an area of operational improvement, design component 936 can analyze one or more inventories of a current or last-known configuration of an industrial system, e.g., a current or last-known service(s) operating in the industrial system. The level of information granularity afforded by configuration unit(s) that enables generation of the inventories and configuration records generally is superior to that of a conventional architecture. Thus, the analysis performed herein is richer and can provide improved insight that analyses performed in conventional architectures. Based on the analysis, design component 936 can issue a report that discloses at least one area of operational improvement and at least one related solution. Issuance of the report includes generation of the report and retention thereof in data storage 962. In certain embodiments, design component 936 can convey the report to exchange host 910, which can deliver it to the industrial system or a related entity (system, component, platform, etc.).

Exchange host 910 can deliver the report in accordance with the various modalities described supra in connection with response(s) to a query. In additional or alternative embodiments, design component 936 can deliver the report directly to the industrial system or the related entity (host, resource, etc.) in accordance with a policy that includes a set of settings for delivery of the report. In further embodiments, management component 932 can acquire the report and convey it to exchange host 910 for delivery to the industrial system or the related entity, management component 932 can acquire (e.g., retrieve) the report in accordance with a policy in policy storage 958, wherein the policy can include, for example, a first set of settings for acquisition of the report and a second set of settings for delivery of such reports. As an illustration, a report associated with an area of operational improvement in a portion of an industrial system that has been identified as critical to operation of the industrial system can be delivered upon creation thereof or shortly thereafter (e.g., milliseconds or seconds after creation of the report), or upon resource for delivery of the report become available.

Delivery of a report associated with an area of improvement can provide an up-sell opportunity for the service provider that administers service provider platform 630. For instance, the report can include promotional material (a brochure with functional features, testimonial(s), promotional price set-point(s), performance data, etc.) related to equipment (e.g., a programmable automation controller or an EOI) or software or firmware for operation of the equipment. The promotional material can convey to a recipient of the report a variety of advantages associated with adoption of the promoted equipment or the software or firmware for operation of the equipment.

In certain embodiments, based on the analysis indicated supra, design component 936 can generate a solution for an area of improvement. For example, design component 936 can direct (e.g., deliver a computer-executable instruction to) service generator 928 to compose a service from a plurality of two or more services available to the industrial system or developed by the service provider platform 630. Service generator 928 can manage interfaces associated with at least one of the plurality of two or more services can be implemented in accordance with the compact approach or the loose approach described supra. The service so composed is a composite service, as described supra (see, e.g., description related to FIG. 4). In the alternative or in addition, service generator 928 can combine one or more of at least two reusable definitions (e.g., reusable definition(s) 110) or at least two specifications (e.g., specification(s) 112) to generate a service. The service so composed also is a composite service in that functionality of the service originates through combination of the plurality of two or more reusable definitions. In such scenario, the at least two or more reusable definitions or the at least two specifications are not part of specific services but rather are available as specifications that implement particular functionalities. In an aspect, the at least two or more reusable definitions, the at least two specification, or a combination thereof, can implement specific functionality defined or disclosed in one or more interface components; as described supra, the one or more interface components can be retained as part of at least one configuration unit in conf. unit(s) 956. Combination of reusable definitions can occur at disparate levels of operational granularity (or granularity): A first reusable definition with a first level of granularity (e.g., parts such as valves) can be combined with a second reusable definition with the same level of granularity (e.g., parts such as pressure gauge), the resulting third reusable definition can have a second level of granularity (e.g., equipment such as motor(s)) and can in turn be combined with a fourth reusable definition with the second level of granularity (e.g., equipment such as bat or tank). It should be appreciated that combination of two reusable definitions also is a reusable definition. Services available to the industrial system or developed by the service provider platform 630 can be retained as part of service(s) 966, whereas various reusable definitions can stored in data storage 962 or other, dedicated storage (e.g., library storage; not shown) in repository 950 or repository 970. As another alternative or an additional aspect, service generator 928 can produce a composite service through combination of a service and at least one reusable definition that is not part of another service.

When implemented (executed, compiled and executed, etc.), a composite service can provide improved functionality (e.g., a set of functional features) to the industrial system. In an aspect, service generator 928 can compose the service in accordance with at least one constraint defined by a set of rules, as described supra.

Design component 936 also can exploit historical data related to various configurations of an industrial system (e.g., an industrial automation system) to identify an area of design improvement and generate a service(s) or to modify (upgrade, retrograde, etc.) an extant service to accomplish one or more efficiencies, such as increased manufacturing yield, reduced I/O communication latency, increased data and metadata visibility, improved security, reduced downtime of equipment, shorter time-to-market, or the like. An area of design improvement refers to a product or service that is or may be offered by a service provider and that can be developed further in order to attain increased performance, as defined by a set of metrics established by the service provider or standardization group(s), or fulfill regulation(s). Services generated or modified in response to such an identification can be released by a service provider as part of new products or services. In an aspect, design component 936 can analyze one or more configurations of the industrial system and related data available to the D&M host 920 in order to identify at least one design modification or added feature. In another aspect, based on mutual agreement (e.g., compensation for data collection or delivery) and related policy (e.g., scope of data that can be collected), design component 938 can extract system intelligence (data, metadata, performance reports, etc.) from a group of industrial systems that consume a product or a service of the service provider that administer the D&M host 920. D&M host 920, or one or more components therein, can retain the intelligence in data storage 962. To identify an area of design improvement, such intelligence can be exploited to infer the area of design improvement. An advantage of inferring an area of design improvement is that the service provider can anticipate developments of a product or service that are likely to appealing to an administrator or operator of an industrial system. It is noted that design component 936 can utilize approaches other than inference to identify an area of design improvement based on historical data.

To make an inference, e.g., to reason and draw a conclusion based on a set of metrics, formal arguments, or known mathematical outcomes in controlled scenarios, design component 936 can exploit artificial intelligence (AI) techniques, which can be formalized in a methodology that is retained in repository 950 or other suitable repository functionally coupled (e.g., communicatively coupled) to D&M host 920. Based on the inference, design component 936 can provide service generator 928 with a set of directives to generate or update one or more services. Artificial intelligence techniques typically apply advanced mathematical algorithms or methods to a data set; such algorithms or methods are part of the methodology and can include decision trees, neural networks, regression analysis, principal component analysis (PCA) for feature and pattern extraction, cluster analysis, genetic algorithm, or reinforced learning. In particular, design component 936, or one or more components therein, can employ at least one of numerous methods for learning from the data set and then drawing inferences from models formally represented by employed method. As an example, the numerous methods for learning can include Hidden Markov Models (HMMs) and related prototypical dependency models can be employed. General probabilistic graphical models, such as Dempster-Shafer networks and Bayesian networks like those created by structure search using a Bayesian model score or approximation can also be employed. In addition, linear classifiers, such as support vector machines (SVMs), non-linear classifiers like methods referred to as "neural network" methodologies, fuzzy logic methodologies can also be employed. Moreover, game theoretic models (e.g., game trees, game matrices, pure and mixed strategies, utility algorithms, Nash equilibria, evolutionary game theory, etc.) and other approaches that perform data fusion, etc., can be exploited by design component 936.

Additionally or alternatively, design component 936 can include an integrity component (not shown) that can test and diagnose at least one functional record associated with a configuration record. The integrity component (not shown) also can troubleshoot issue(s) identified while testing and diagnosing the at least one functional record.

In example embodiment 900, processor(s) 944 can be configured to execute or can execute computer-executable instructions (not shown) stored in a memory to implement or provide at least part of the described functionality of D&M host 920. In the illustrated example embodiment 900, such memory is repository 950 or an element therein. In additional or alternative embodiments, the memory can be embodied in one or more of repositories $644_1$-$644_K$ (not shown in FIG. 9). Such computer-executable instructions can include program modules or software or firmware applications that implement specific tasks which can be accomplished, for example, through one or more of the methods described in the subject specification and that are associated, at least in part, with functionality or operation of example system 600. In certain embodiments, one or more of configuration component 924, management component 932, at least a portion of I/O interfaces 940, service generator 928, design component 936 1308, and component(s) therein, can be can be implemented as software or firmware that can be retained in repository 950 as one or more sets of computer-executable instructions that, when executed by processor(s) 944, implement (e.g., compile, link, compile and link, compile and execute, execute . . . ) such components and their associated functionality as described herein in various aspects. To provide such functionality, in one aspect, processor(s) 949 can exploit a bus 945 to functionally couple (e.g., communicatively couple) to at least one of the components included in the D&M host 920 and to memory 1430, in order to exchange data or any other information amongst the at least one of the components (or component(s) therein) and memory 1430 or memory elements therein. The exchanged information can include at least one of computer-executable instruction(s), computer-executable code structure(s), data structures, or the like.

Figure 10:
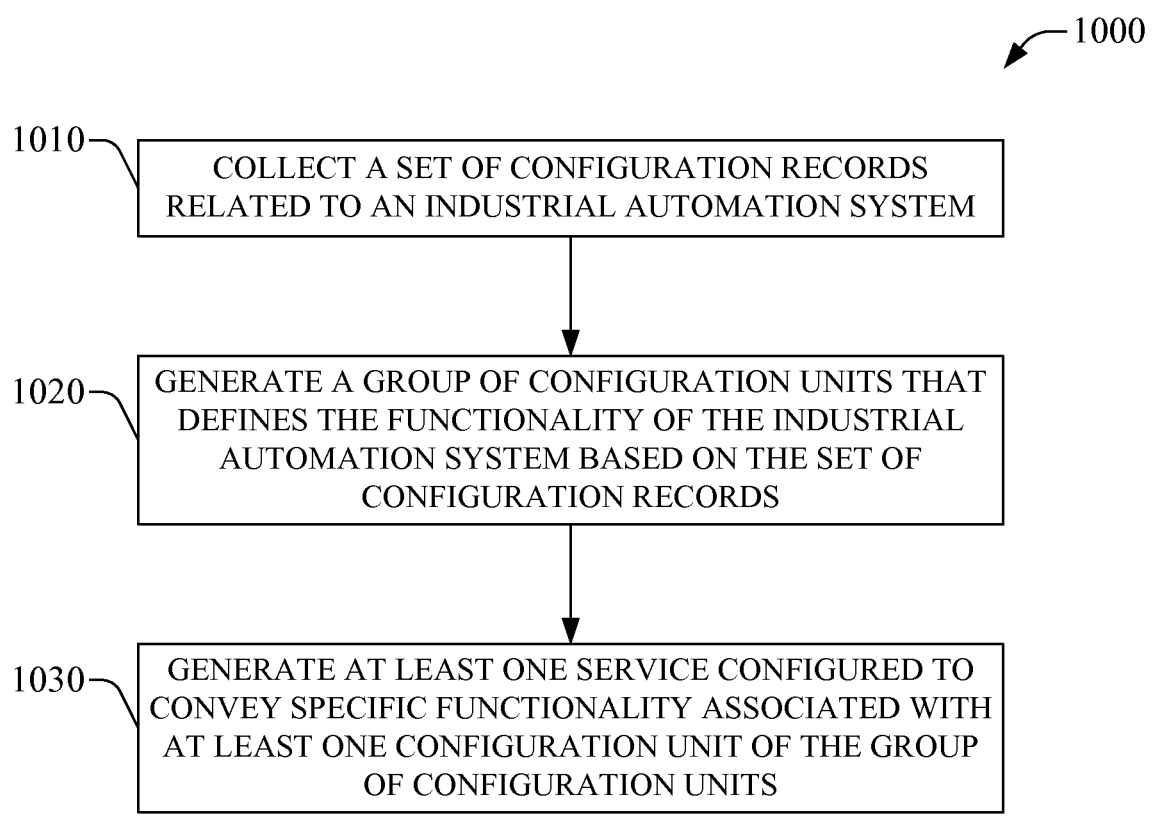
FIG. 10 presents a flowchart of an example method for configuring a platform to manage development of an industrial automation system according to aspects of the subject disclosure.
Figure 11:
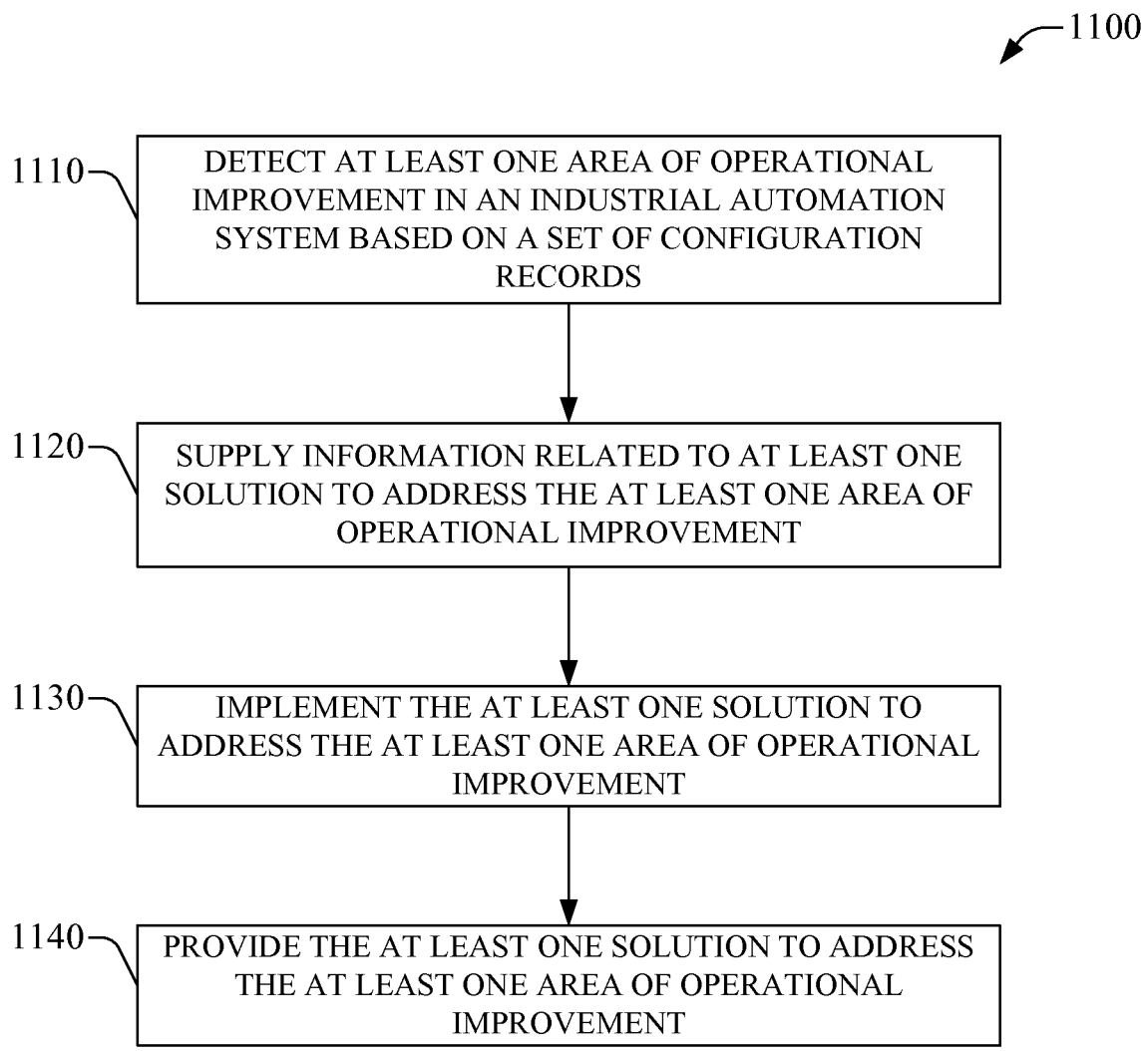
FIG. 11 presents an example method for developing an industrial automation system according to aspects of the subject disclosure.

In view of the example systems and related embodiments described supra, example methods that can be implemented in accordance with the disclosed subject matter can be better appreciated with reference to flowcharts in FIGS. 10-11. For purposes of simplicity of explanation, various methods disclosed herein are presented and described as a series of acts; however, it is to be understood and appreciated that the subject disclosure is not limited by the order of acts, as some acts may occur in different order and/or concurrently with other acts from that shown and described herein. It is noted that not all illustrated acts may be required to implement a described method in accordance with the subject specification. In addition, for example, one or more methods disclosed herein could alternatively be represented as a series of interrelated states or events, such as in a state diagram. Moreover, interaction diagram(s) or call flow(s) represent several of the example methods disclosed herein in accordance with the described subject matter; particularly in instances when disparate entities, or functional elements, enact disparate portions of one or more of the several methods. Furthermore, two or more of the disclosed example methods can be implemented in combination, to accomplish one or more features or advantages described in the subject disclosure.

FIG. 10 presents a flowchart of an example method 1000 for configuring a platform that enables management or development an industrial automation system according to aspects of the subject disclosure. In certain embodiments, a platform (e.g., D&M platform 634) or one or more hosts thereof can implement (e.g., execute) the subject example method 1000. In alternative or additional embodiments, one or more processors (e.g., processor(s) 944) that are configured to enable or that enable functionality of the service provider host can effect the subject example method 1000.

At act 1010, a set of configuration records related to the industrial automation system is collected. In an aspect, the collecting includes receiving the set of configuration records from the industrial automation system in response to occurrence of a predetermined event at the industrial automation system. In another aspect, the collecting includes retrieving the set of configuration records from the industrial automation system according to a policy comprising settings that regulate access to the industrial automation system At act 1020, a group of configuration units that defines the functionality of the industrial automation system is generated based on the set of configuration records. In an aspect, generating such group of configuration units includes creating at least one configuration unit in full. In another aspect, generating such group of configuration units includes creating at least one configuration unit by modifying one or more extant configuration units. In yet another aspect, generating such group of configuration units includes creating at least a portion of a configuration unit and merging at least the portion of the configuration unit with a disparate configuration unit. The functionality defined by the group of configuration units refers collectively to various functionalities of disparate parts (visualization layer, control layer, communication layer, equipment layer (e.g., Enterprise Manufacturing System (EMS)), etc.) of the industrial automation system. Each configuration unit in the group of configuration units contains data and metadata that identifies a part of the industrial automation system and characterizes functional feature(s) thereof. Functional feature(s) characterized by a configuration module represents specific functionality associated thereto. The group of configuration units is retained in a memory or substantially any computer machine-readable storage medium.

At act 1030, at least one service configured to convey functionality associated with at least one configuration unit is generated. Generating such service can include acquiring (retrieving, receiving, requesting and receiving, etc.) at least one specification that discloses functionality of at least one interface component within the at least one configuration unit. In addition, the generating can include composing computer-executable programming code based on the at least one specification as described supra. In certain embodiments, service generator 928 generates such service.

FIG. 11 presents a flowchart of an example method 1100 for developing an industrial automation system according to aspects of the subject disclosure. In certain embodiments, a platform (e.g., D&M platform 634) or one or more hosts thereof can implement (e.g., execute) the subject example method 1100. In alternative or additional embodiments, one or more processors (e.g., processor(s) 944) that are configured to enable or that enable functionality of the service provider host can effect the subject example method 1100. While illustrated in connection to an area of operational improvement, the subject example method 1100 also can be enacted in substantially the same manner in connection with an area of design improvement related to the industrial automation system. At act 1110, at least one area of operational improvement in an industrial automation system is detected based on a set of configuration records. At act 1120, information related to at least one solution (e.g., system configuration) to address the at least one area of operational improvement is supplied. In certain scenarios, supplying such information can include delivering promotional material related to equipment (e.g., a programmable automation controller or an EOI) or software or firmware for operation of the equipment; delivering the promotional material is intended for eliciting a response from the industrial automation system or an administrator thereof based on the content of the promotional material. At act 1130, the at least one solution to address the at least one area of operational improvement is implemented Implementing the at least one solution can include generating a composite service by combining two or more services; by combining two or more reusable definitions, two or more specifications, or combinations thereof; or by combining a service and at least one reusable definition or at least one specification. Combining services, reusable definitions or specification, or services and reusable definitions, can be implemented as described supra. At 1140, the at least one solution to address the at least one are of operational improvement is provided. In an aspect, the providing includes delivering the composite service to the industrial system, or posting the composite service in a web-based host to be retrieved (e.g., downloaded) by the industrial system or an administrator thereof. In certain scenarios, posting the service in the web-based host can be accompanied by broadcasting a message indicative of the availability of the composite service for download. In another aspect, the providing can include identifying an updated service, and posting the update service in a web-based host for retrieval (e.g., download) from a location related to the industrial system. In yet another aspect, the providing includes remotely updating one or more of at least one service, at least one reusable definition, at least one specification, or a combination thereof, that reside within a physical location of the industrial system.

While example methods 1000 and 1100 are illustrated for an automation industrial system as an embodiment of an industrial environment, the subject example methods also can be implemented for embodiments of an industrial environment, such as a planning system (e.g., Enterprise Resource Planning (ERP) system), information technology (IT) systems, power and energy systems (hydroelectric systems, mining systems, oil and gas extraction and distribution systems, etc.) and related control systems, and so forth.

Methods disclosed throughout the subject specification and annexed drawings are capable of being stored on an article of manufacture (a removable volatile memory, a removable non-volatile memory, a non-removable volatile memory, a non-removable non-volatile memory, etc.) to enable transporting and transferring such methods to computers for execution, and thus implementation, by a processor or for storage in a memory. In an aspect, one or more processors, such as processor(s) that can enact the one or more methods described herein, can be employed to execute computer-executable code instructions retained in a memory (volatile or non-volatile) or any computer-readable or machine-readable storage medium, in order to implement one or more of the methods described herein. Such computer-executable code instructions provide a computer-executable or machine-executable framework to enact the various methods described herein.

Figure 12:
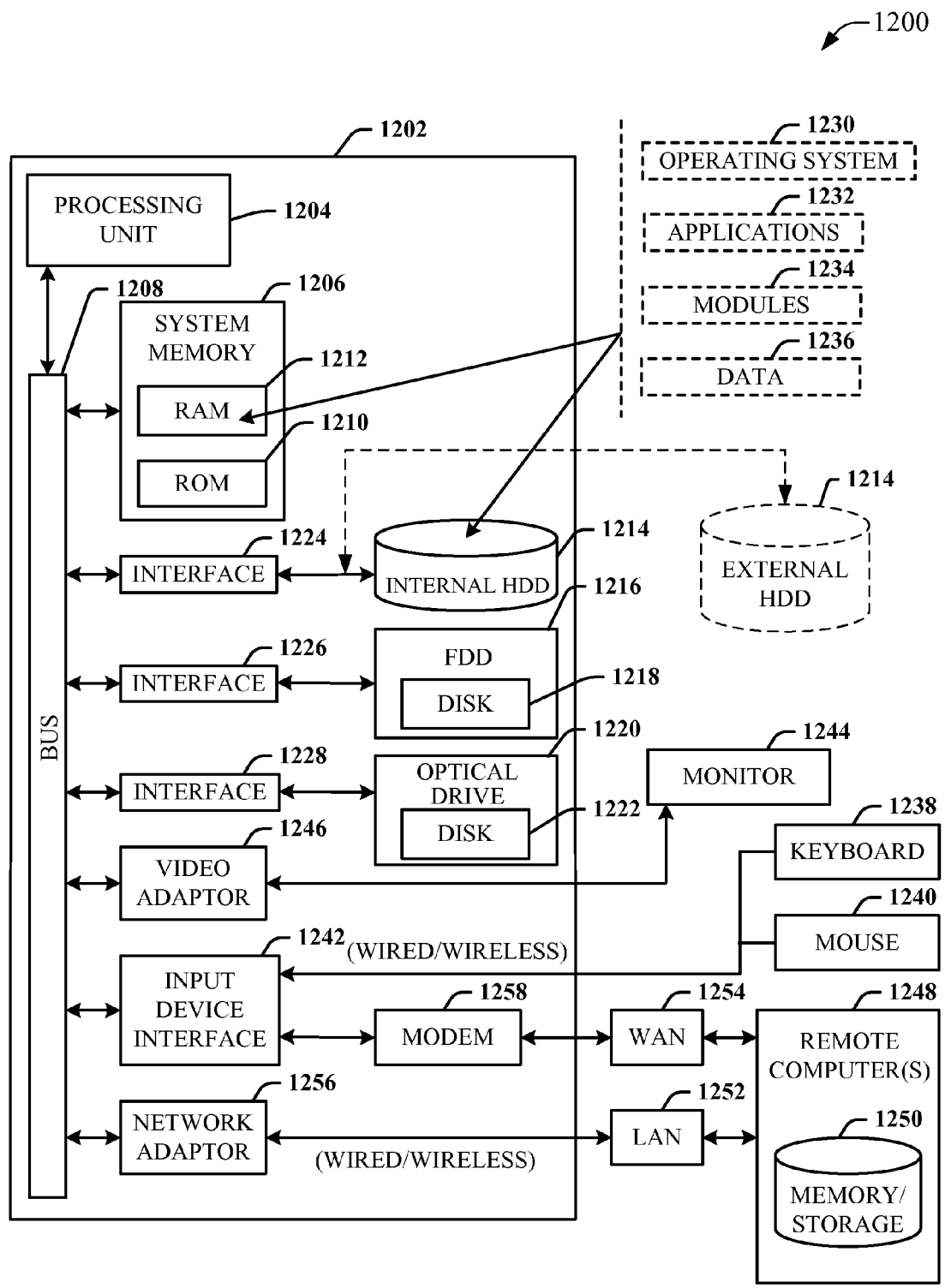
FIG. 12 illustrates a block diagram of a computer configured to execute the aspects disclosed herein.

Referring now to FIG. 12, there is illustrated a block diagram of a computer configured to execute the disclosed architecture. In order to provide additional context for various aspects thereof, FIG. 12 and the following discussion are intended to provide a brief, general description of a suitable computing environment 1200 in which the various aspects of the innovation can be implemented. While the description above is in the general context of computer-executable instructions that may run on one or more computers, those skilled in the art will recognize that the innovation also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the innovation may also be practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media and/or communications media, which two terms are used herein differently from one another as follows. Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 12, the example environment 1200 for implementing various aspects includes a computer 1202, the computer 1202 including a processing unit 1204, a system memory 1206 and a system bus 1208. The system bus 1208 couples system components including, but not limited to, the system memory 1206 to the processing unit 1204. The processing unit 1204 can be any of various commercially available processors. Dual microprocessors and other multi-processor architectures may also be employed as the processing unit 1204.

The system bus 1208 can be any of several types of bus structure that may further interconnect to a memory bus (with or without a memory controller), a peripheral bus, and a local bus using any of a variety of commercially available bus architectures. The system memory 1206 includes read-only memory (ROM) 1210 and random access memory (RAM) 1212. A basic input/output system (BIOS) is stored in a non-volatile memory 1210 such as ROM, EPROM, EEPROM, which BIOS contains the basic routines that help to transfer information between elements within the computer 1202, such as during start-up. The RAM 1212 can also include a high-speed RAM such as static RAM for caching data.

The computer 1202 further includes an internal hard disk drive (HDD) 1214 (e.g., EIDE, SATA), which internal hard disk drive 1214 may also be configured for external use in a suitable chassis (not shown), a magnetic floppy disk drive (FDD) 1216, (e.g., to read from or write to a removable diskette 1218) and an optical disk drive 1220, (e.g., reading a CD-ROM disk 1222 or, to read from or write to other high capacity optical media such as the DVD). The hard disk drive 1214, magnetic disk drive 1216 and optical disk drive 1220 can be connected to the system bus 1208 by a hard disk drive interface 1224, a magnetic disk drive interface 1226 and an optical drive interface 1228, respectively. The interface 1224 for external drive implementations includes at least one or both of Universal Serial Bus (USB) and IEEE 1394 interface technologies. Other external drive connection technologies are within contemplation of the subject innovation.

The drives and their associated computer-readable media provide nonvolatile storage of data, data structures, computer-executable instructions, and so forth. For the computer 1202, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the example operating environment, and further, that any such media may contain computer-executable instructions for performing the methods of the disclosed innovation.

A number of program modules can be stored in the drives and RAM 1212, including an operating system 1230, one or more application programs 1232, other program modules 1234 and program data 1236. All or portions of the operating system, applications, modules, and/or data can also be cached in the RAM 1212. It is to be appreciated that the innovation can be implemented with various commercially available operating systems or combinations of operating systems.

A user can enter commands and information into the computer 1202 through one or more wired/wireless input devices, e.g., a keyboard 1238 and a pointing device, such as a mouse 1240. Other input devices (not shown) may include a microphone, an IR remote control, a joystick, a game pad, a stylus pen, touch screen, or the like. These and other input devices are often connected to the processing unit 1204 through an input device interface 1242 that is coupled to the system bus 1208, but can be connected by other interfaces, such as a parallel port, an IEEE 1394 serial port, a game port, a USB port, an IR interface, etc.

A monitor 1244 or other type of display device is also connected to the system bus 1208 via an interface, such as a video adapter 1246. In addition to the monitor 1244, a computer typically includes other peripheral output devices (not shown), such as speakers, printers, etc.

The computer 1202 may operate in a networked environment using logical connections via wired and/or wireless communications to one or more remote computers, such as a remote computer(s) 1248. The remote computer(s) 1248 can be a workstation, a server computer, a router, a personal computer, portable computer, microprocessor-based entertainment appliance, a peer device or other common network node, and typically includes many or all of the elements described relative to the computer 1202, although, for purposes of brevity, only a memory/storage device 1250 is illustrated. The logical connections depicted include wired/wireless connectivity to a local area network (LAN) 1252 and/or larger networks, e.g., a wide area network (WAN) 1254. Such LAN and WAN networking environments are commonplace in offices and companies, and facilitate enterprise-wide computer networks, such as intranets, all of which may connect to a global communications network, e.g., the Internet.

When used in a LAN networking environment, the computer 1202 is connected to the local network 1252 through a wired and/or wireless communication network interface or adapter 1256. The adaptor 1256 may facilitate wired or wireless communication to the LAN 1252, which may also include a wireless access point disposed thereon for communicating with the wireless adaptor 1256.

When used in a WAN networking environment, the computer 1202 can include a modem 1258, or is connected to a communications server on the WAN 1254, or has other means for establishing communications over the WAN 1254, such as by way of the Internet. The modem 1258, which can be internal or external and a wired or wireless device, is connected to the system bus 1208 via the serial port interface 1242. In a networked environment, program modules depicted relative to the computer 1202, or portions thereof, can be stored in the remote memory/storage device 1250. It will be appreciated that the network connections shown are example and other means of establishing a communications link between the computers can be used.

The computer 1202 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10 BaseT wired Ethernet networks used in many offices.

Figure 13:
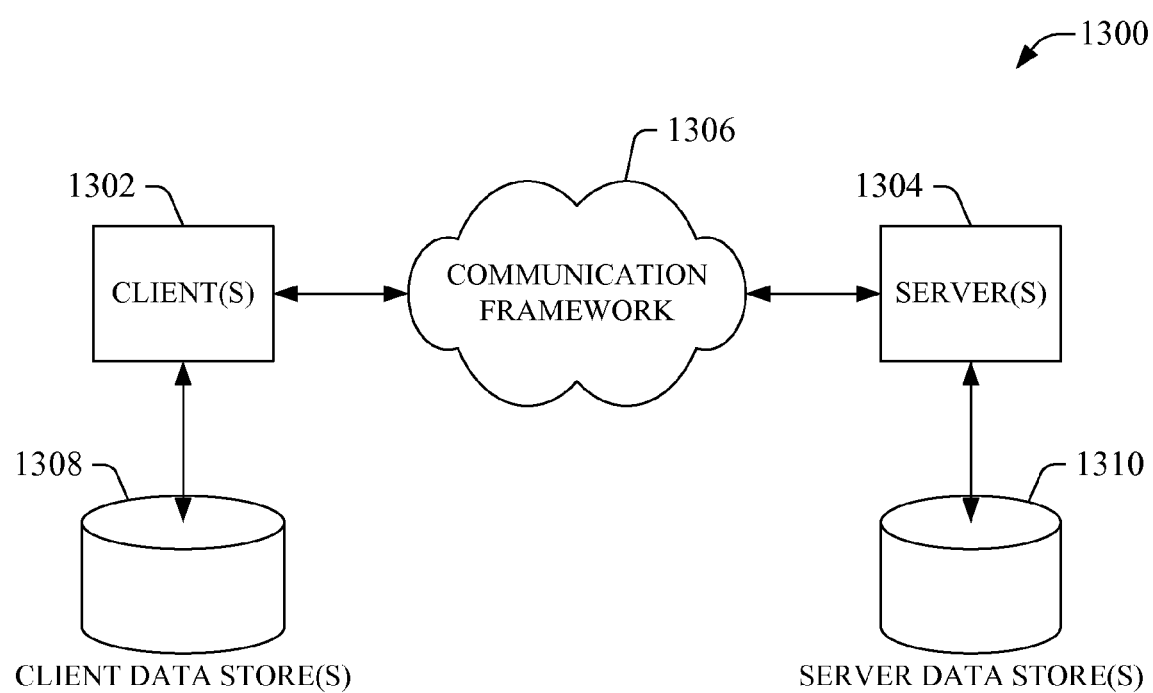
FIG. 13 illustrates a schematic block diagram of an example computing environment according to aspects of the subject disclosure.

Referring now to FIG. 13, there is illustrated a schematic block diagram of an example computing environment 1300 in accordance with another aspect. The system 1300 includes one or more client(s) 1302. The client(s) 1302 can be hardware and/or software (e.g., threads, processes, computing devices). The client(s) 1302 can house cookie(s) and/or associated contextual information by employing the subject innovation, for example.

The system 1300 also includes one or more server(s) 1304. The server(s) 1304 can also be hardware and/or software (e.g., threads, processes, computing devices). The servers 1304 can house threads to perform transformations by employing the invention, for example. One possible communication between a client 1302 and a server 1304 can be in the form of a data packet adapted to be transmitted between two or more computer processes. The data packet may include a cookie and/or associated contextual information, for example. The system 1300 includes a communication framework 1306 (e.g., a global communication network such as the Internet) that can be employed to facilitate communications between the client(s) 1302 and the server(s) 1304.

Communications can be facilitated via a wired (including optical fiber) and/or wireless technology. The client(s) 1302 are operatively connected to one or more client data store(s) 1308 that can be employed to store information local to the client(s) 1302 (e.g., cookie(s) and/or associated contextual information). Similarly, the server(s) 1304 are operatively connected to one or more server data store(s) 1310 that can be employed to store information local to the servers 1304.

In the subject specification and annexed drawings, terms such as "store," "data store," data storage," "repository," and substantially any term(s) that convey other information storage component(s) relevant to operation and functionality of a functional element or component described herein, refer to "memory components," or entities embodied in a "memory" or components comprising the memory. The memory components described herein can be either volatile memory or nonvolatile memory, or can include both volatile and nonvolatile memory.

By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of further illustration and not limitation, RAM can be available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

The various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Additionally, at least one processor may comprise one or more modules operable to perform one or more of the steps and/or actions described above.

Further, the steps and/or actions of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An example storage medium may be coupled to the processor, such that the processor can read information from, and write information to, the storage medium. In the alternative, the storage medium may be integral to the processor. Further, in some aspects, the processor and the storage medium may reside in an ASIC. Additionally, the ASIC may reside in a user terminal. In the alternative, the processor and the storage medium may reside as discrete components in a user terminal. Additionally, in some aspects, the steps and/or actions of a method or algorithm may reside as one or any combination or set of codes and/or instructions on a machine readable medium and/or computer readable medium, which may be incorporated into a computer program product.

In one or more aspects, the functions described may be implemented in hardware, software, firmware, or any combination thereof. If implemented in software, the functions may be stored or transmitted as one or more instructions or code on a computer-readable medium. Computer-readable media includes both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection may be termed a computer-readable medium. For example, if software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs usually reproduce data optically with lasers. Combinations of the above should also be included within the scope of computer-readable media.

What has been described above includes examples of the disclosed innovation. It is, of course, not possible to describe every conceivable combination of components and/or methodologies, but one of ordinary skill in the art may recognize that many further combinations and permutations are possible. Accordingly, the innovation is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. An apparatus, comprising:
    at least one memory comprising computer-executable code instructions; and
    at least one processor functionally coupled to the at least one memory and configured to execute the computer-executable code instructions to implement components comprising:
        a configuration component configured to retrieve one or more configuration records from an industrial system and create at least one configuration unit that defines functionality of the industrial system based on the one or more configuration records, wherein the one or more configuration records contain at least identity information that identifies one or more industrial devices of the industrial system and one or more security profiles of the one or more industrial devices; and
        a design component configured to identify an area of operational improvement for the industrial system based on analysis of the one or more configuration records, wherein the area of operational improvement comprises at least one device or service determined to be performing outside a defined performance metric; and
        a service generator configured to create, based on the area of operational improvement, a service that exposes at least a subset of the functionality defined by the at least one configuration unit.

2. The apparatus of claim 1, wherein the at least one configuration unit comprises at least one data structure that characterizes the industrial system logically.

3. The apparatus of claim 2, wherein the configuration component is further configured to generate the at least one data structure based on a set of rules that are specific to the industrial system, and the at least one data structure is one of a data tree or a relational table.

4. The apparatus of claim 1, wherein the configuration component is further configured to create another configuration unit in response to receipt of an update of a configuration record related to the industrial system and conveyed by a first configuration unit of the at least one configuration unit.

5. The apparatus of claim 2, wherein the service is configured to generate a view of the at least one data structure that represents at least the subset of the functionality.

6. The apparatus of claim 5, wherein the service is further configured to generate the view in response to reception of signaling that conveys occurrence of a defined event related to operation of a service provider platform that includes the apparatus.

7. The apparatus of claim 5, wherein the service is further configured to generate the view in response to generation of or an update to the at least one configuration unit.

8. The apparatus of claim 5, wherein the view of the at least one data structure is at least one of a logical view that represents a functional feature represented by at least one data structure or a hardware view that represents a physical aspect of the industrial system.

9. The apparatus of claim 1, wherein the at least one configuration unit comprises an interface component that provides at least the subset of the functionality associated with the at least one configuration unit.

10. The apparatus of claim 9, wherein the service is further configured to generate an inventory of physical features that enable functionality associated with the interface component.

11. The apparatus of claim 9, wherein the service is further configured to expose at least one physical feature that enables functionality of the interface component.

12. The apparatus of claim 11, wherein the components further comprise a management component configured to respond to a query from the industrial system requesting information regarding an availability of an update for at least one functional element of the industrial system.

13. The apparatus of claim 12, wherein the management component is further configured to perform a comparison of at least one of the one or more configuration records with data associated with development of the at least one functional element, and deliver a response to the industrial system based on a result of the comparison.

14. The apparatus of claim 13, wherein the management component is further configured to acquire the data associated with the development of the at least one functional element from at least one repository related to a service provider platform other than a service provider platform that includes the apparatus.

15. The apparatus of claim 13, wherein the response comprises a report that specifies whether an update is available for the at least one functional element.

16. The apparatus of claim 12, wherein the management component is further configured to generate an inventory of a current or last-known configuration of the industrial system based on the one or more configuration records and to identify at least one difference between the current or last-known configuration and a previous configuration of the industrial system.

17. The apparatus of claim 16, wherein the inventory is directed to a physical aspect of the industrial system or a software aspect of the industrial system.

18. The apparatus of claim 16, wherein the management component is further configured to acquire the one or more configuration records from the industrial system in accordance with a defined access policy associated with the industrial system, and the one or more configuration records comprise a source of at least one of data or metadata associated with generation of the inventory.

19. The apparatus of claim 1, wherein the design component is further configured to generate an inventory of a current or last-known configuration of the industrial system based on the one or more configuration records and identify the area of operational improvement based at least in part on a result of an analysis of the current or last-known configuration.

20. The apparatus of claim 19, wherein the design component is further configured to generate a report that discloses the area of operational improvement and at least one related solution based on the result of the analysis, and wherein the at least one related solution comprises one or more of a recommended hardware update or a recommended software update.

21. The apparatus of claim 20, wherein the design component is further configured to direct the report to an entity associated with the industrial system in accordance with a policy that defines one or more settings for delivery of the report.

22. The apparatus of claim 19, wherein the design component is further configured to generate a recommended solution for the area of operational improvement.

23. The apparatus of claim 22, wherein the design component is further configured to instruct the service generator to create a composite service based on the recommended solution, and wherein the composite service comprises two or more services, including the service, available to the industrial system or developed by a service provider platform that includes the apparatus.

24. A method, comprising:
collecting, by a system comprising a processor, configuration records related to an industrial automation system, wherein the configuration records specify at least one of an identity of one or more industrial devices comprising the industrial automation system and security profiles of the one or more industrial devices;
generating configuration units that define functionality of the industrial automation system based on the configuration records;
detecting an area of operational improvement in the industrial automation system based on analysis of the configuration records, wherein the area of operational improvement relates to a device or service identified as performing outside a defined performance metric; and
generating at least one service based on the area of operational improvement, wherein the at least one service coveys at least a subset of the functionality associated with at least one configuration unit of the configuration units.

25. The method of claim 24, further comprising:
generating information identifying the area of operational improvement and at least one solution for addressing the area of operational improvement, wherein the solution comprises the at least one service.

26. The method of claim 25, further comprising:
implementing the at least one solution, wherein the implementing comprises generating a composite service comprising the at least one service; and
sending the at least one solution to the industrial automation system.

27. The method of claim 26, wherein the generating comprises at least one of:
combining a plurality of services including the at least one service;
combining a plurality of reusable definitions; or
combining the at least one service with at least one reusable definition.

28. The method of claim 24, further comprising:
generating an inventory of a current or last-known configuration of the industrial automation system based on the configuration records; and
identifying the area of operational improvement based at least in part on a result of an analysis of the current or last-known configuration.

29. A non-transitory computer-readable medium having stored thereon computer-readable instructions that, in response to execution, cause a system comprising at least one processor to perform operations, comprising:
collecting information relating to at least one operational condition of an industrial automation system, the information comprising at least identity information that identifies one or more industrial devices of the industrial automation system, and one or more security profiles associated with the one or more industrial devices;
generating configuration units that define a functionality of the industrial automation system based on the information;
determining an area of improvement for the industrial automation system based on the information, wherein determining the area of improvement comprises identifying at least one device or service having a performance that deviates from a defined performance metric; and
generating, based on the area of improvement, at least one service configured to convey at least a subset of the functionality associated with at least one configuration unit of the configuration units.

30. The non-transitory computer-readable medium of claim 29, wherein the operations further comprise:
generating report information identifying the area of improvement and a solution to address the area of improvement.

\* \* \* \* \*